(12) United States Patent
Yoshida et al.

(10) Patent No.: US 10,687,583 B2
(45) Date of Patent: Jun. 23, 2020

(54) SHOCK ABSORBING MEMBER FOR SOLE OF SHOE AND SHOE INCLUDING SHOCK ABSORBING MEMBER

(71) Applicant: Mizuno Corporation, Osaka (JP)

(72) Inventors: Yohei Yoshida, Osaka (JP); Kouji Ito, Osaka (JP)

(73) Assignee: Mizuno Corporation, Osaka (JP)

( * ) Notice: Subject to any disclaimer, the term of this patent is extended or adjusted under 35 U.S.C. 154(b) by 49 days.

(21) Appl. No.: 16/141,679

(22) Filed: Sep. 25, 2018

(65) Prior Publication Data

US 2019/0090582 A1    Mar. 28, 2019

(30) Foreign Application Priority Data

Sep. 27, 2017  (JP) ................ 2017-186833
Feb. 2, 2018   (JP) ................ 2018-017011

(51) Int. Cl.

| A43B 13/18 | (2006.01) |
| A43B 7/19 | (2006.01) |
| A43B 13/12 | (2006.01) |
| A43B 13/14 | (2006.01) |
| F16F 3/087 | (2006.01) |
| A43B 13/04 | (2006.01) |
| A43B 21/26 | (2006.01) |
| F16F 3/02 | (2006.01) |
| F16F 1/02 | (2006.01) |

(52) U.S. Cl.
CPC .............. *A43B 13/181* (2013.01); *A43B 7/19* (2013.01); *A43B 13/04* (2013.01); *A43B 13/12* (2013.01); *A43B 13/141* (2013.01); *A43B 13/183* (2013.01); *A43B 21/26* (2013.01); *F16F 3/0876* (2013.01); *F16F 1/025* (2013.01); *F16F 3/02* (2013.01); *F16F 2224/025* (2013.01)

(58) Field of Classification Search
CPC ..... A43B 13/181; A43B 13/04; A43B 13/141; A43B 13/183; A43B 13/12; A43B 21/26; F16F 3/0876
See application file for complete search history.

(56) References Cited

U.S. PATENT DOCUMENTS

| 4,843,737 A * | 7/1989 | Vorderer | A43B 13/182 36/38 |
| 5,149,066 A * | 9/1992 | Snaith | F16F 7/14 248/636 |
| 8,146,270 B2 | 4/2012 | Aveni et al. | |

(Continued)

FOREIGN PATENT DOCUMENTS

DE    202012101767 U1    10/2013

*Primary Examiner* — Ted Kavanaugh
(74) *Attorney, Agent, or Firm* — Troutman Sanders LLP; James E. Schutz; Micah B. Hensley

(57) ABSTRACT

A shock absorbing member includes: support members spaced apart from each other; and a connection member laid across, and connecting together, the support members. Each of the support members includes: an inner wall capable of elastically deforming by external force in a vertical direction; and a first tube and a second tube each provided to one of an outer wall and the inner wall. While inserted through the first and second tubes of the support members, the connection member is integrally formed in a closed shape with ends of the connection member having no seams.

10 Claims, 28 Drawing Sheets

(56) References Cited

U.S. PATENT DOCUMENTS

| | | | |
|---|---|---|---|
| 8,397,402 B2* | 3/2013 | Lucas | A43B 3/0042 |
| | | | 36/102 |
| 9,316,282 B1* | 4/2016 | Harris | A43B 13/183 |
| 2006/0065499 A1* | 3/2006 | Smaldone | A43B 21/26 |
| | | | 188/372 |
| 2007/0119074 A1 | 5/2007 | Aveni et al. | |
| 2008/0098619 A1 | 5/2008 | Smaldone et al. | |
| 2010/0192407 A1 | 8/2010 | Aveni et al. | |
| 2011/0005100 A1 | 1/2011 | Smaldone et al. | |
| 2012/0167415 A1 | 7/2012 | Aveni et al. | |
| 2013/0118033 A1 | 5/2013 | Smaldone et al. | |
| 2013/0118034 A1 | 5/2013 | Smaldone et al. | |
| 2019/0184613 A1* | 6/2019 | Yoshida | A43B 21/32 |

* cited by examiner

SHOCK ABSORBING MEMBER FOR SOLE OF SHOE AND SHOE INCLUDING SHOCK ABSORBING MEMBER

CROSS-REFERENCE TO RELATED APPLICATION

This application claims priority to Japanese Patent Applications No. 2017-186833 filed on Sep. 27, 2017, and No. 2018-017011 filed on Feb. 2, 2018, the entire disclosures of which are incorporated by reference herein.

BACKGROUND

The present disclosure relates to a shock absorbing member for a sole of a shoe and the shoe including the shock absorbing member.

A shock absorbing member known in the art for a sole of a shoe is disclosed, for example, in U.S. Pat. No. 8,146,270. The shock absorbing member includes: a pair of walls spaced fore and aft from each other and elastically deformable in a fore-aft direction of a shoe by external force in a vertical direction; and a spring member elastically deformable and connecting together the pair of walls provided fore and aft. (See FIG. 5B.) Each of the walls has a substantially center portion in a vertical direction formed to curve and protrude toward the front or the rear of the shoe. Moreover, each wall has an interior wall face provided with a recess in a substantial center of the interior wall face in the vertical direction. The recess extends in the foot width direction of the shoe. Furthermore, the spring member is shaped into a flat plate so that each of a front end and a rear end, of the spring member, shaped in a substantially oval shape in cross-section fits into a corresponding one of the recesses on the walls, and stretches fore and aft.

In the shock absorbing member cited in U.S. Pat. No. 8,146,270, each of the walls elastically deforms by external force in the vertical direction, and, in response to the elastic deformation of each wall, the substantially center portion of the wall in the vertical direction moves toward the fore-aft direction of the shoe. Simultaneously, the spring member is pulled fore and aft while both ends of the spring member fit with the recesses, and elastically deforms. Meanwhile, when the external force in the vertical direction disappears, resilience of each of the walls and spring member causes the shock absorbing member to return to the original state. This exerts shock absorbing properties and repulsive force.

However, the ends of the spring member merely fit with the recesses of the walls. Hence, when the walls elastically deform significantly by relatively large external force, the spring member excessively stretches. As a result, both ends of the spring member might inevitably come off the recesses of the walls. Specifically, it would be difficult to stably hold the spring member against the walls. As a result, the shock absorbing member disclosed in U.S. Pat. No. 8,146,270 might not properly maintain shock absorbing properties and repulsive force depending on the degree of external force.

The present disclosure is conceived in view of the above problems and intends to provide a shock absorbing member for a sole of a shoe. The shock absorbing member maintains shock absorbing properties and repulsive force regardless of the degree of external force.

SUMMARY

In order to achieve the above intention, a first aspect of the present disclosure relates to a shock absorbing member for a sole of a shoe. The shock absorbing member includes: support members spaced apart from each other; and a connection member laid across, and connecting together, the support members, wherein each of the support members includes: a wall capable of elastically deforming by external force in a vertical direction; and at least one tube provided to the wall, and while inserted through the tube of the support member, the connection member is integrally formed in a closed shape with ends of the connection member having no seams.

In this first aspect, (i) the tube provided to the wall moves toward a predetermined direction in response to the elastic deformation, by the external force in the vertical direction, of the wall for each of the support members, and (ii) the connection member inserted through the tube moves in the same direction as the tube moves. While inserted through tubes including the at least one tube of the support members, the connection member is integrally formed in a closed shape with ends of the connection member having no seams therebetween. Thus, even if the wall of each support member elastically deforms by the external force in the vertical direction, the connection member does not easily come off the tube. Specifically, even if the wall of each support member elastically deforms by the external force, the connection member can be stably held by the support members regardless of the degree of the deformation. Therefore, the shock absorbing member in the first aspect can maintain shock absorbing properties and repulsive force regardless of the degree of the external force.

In a second aspect of the present disclosure according to the first aspect, an elastic range of a material of the connection member may be larger than an elastic range of a material of the support member.

In this second aspect, when the external force in the vertical direction is applied to each of the support members, the outer wall of the support member is distorted by bent and deformation; whereas the connection member is distorted by pulling force generated when the tube of each support member moves in a predetermined direction. In this state, since the connection member is made of a material an elastic range of which is relatively wide (i.e., small in resilience decrease), the connection member is restored faster than the support members are. As a result, the resilience of the connection member helps the support members restore themselves. Compared with the case where the support members are restored by themselves, such a feature makes it possible to further enhance the repulsive force of the shock absorbing member.

In a third aspect according to the first aspect or the second aspect of the present disclosure according to the first aspect, the shock absorbing member may have an outer periphery portion formed to be substantially annular in plan view, the connection member may include: first connections extending, along a circumference of the outer periphery portion, between the support members neighboring; and second connections extending inward from the circumference of the outer periphery portion, and when the support members elastically deform, receiving the external force, each of the first and second connections may be pulled in a longitudinal direction of the first and second connections.

Moreover, when the support member 20 elastically deforms by the external force in the vertical direction, the first and second connections are pulled in the respective longitudinal directions. Hence, shock absorbing properties are observed less unevenly and the support members do not excessively deform. Moreover, when the external force F is not applied to the support member, each of the first and second connections generates resilience with which the first and second connections return from a stretched state to a contracted state. In addition, the resilience of the first and second connections contributes to the resilience of the support members. In particular, the resilience generated in the first connections contributes to the neighboring support members. Such features further enhance shock absorbing member and repulsive force. Therefore, the shock absorbing member according to the third aspect can exert greater shock absorbing properties and repulsive force.

In a fourth aspect of the present disclosure according to the third aspect, each of the support members may include: a first tube extending along the circumference of the outer periphery portion; and a second tube extending inward from the circumference of the outer periphery portion and communicating with the first tube, each of the first connections may be provided to the support members while opposing side-ends of the first connection are inserted through the first tube, and each of the second connections may be provided to a corresponding one of the support members while an outer end positioned close to the outer periphery portion is inserted through the second tube.

In this fourth aspect, the first and second connections do not easily come off the support member by the first and second tubes, contributing to enhance the connection between the support member and the first and second connections.

A fifth aspect according to any one of the first to fourth aspects of the present disclosure further may further include a backing plate provided to at least above or below the support members, and laid across the support members neighboring, the backing plate being shaped into a substantial plate.

In the fifth aspect, the backing plate applies the external force in the vertical direction substantially equally among the support members, making it possible to reduction in uneven shock absorbing properties.

A sixth aspect of the present disclosure relates to a shock absorbing member for a sole of a shoe. The shock absorbing member includes: one support member including walls curved to be elastically deformable by external force in a vertical direction, and tubes each provided to a corresponding one of the walls and spaced apart from each other; and a connection member laid across, and connecting together, the tubes, wherein while inserted through the tubes of the support members, the connection member is integrally formed in a closed shape with ends of the connection member having no seams.

As seen in the first aspect, the shock absorbing member according to the sixth aspect can maintain shock absorbing properties and repulsive force regardless of the degree of the external force.

A seventh aspect of the present disclosure relates to a shock absorbing member for a sole of a shoe. The shock absorbing member includes: support members spaced apart from each other; and a connection member laid across, and connecting together, the support members, the connection member being formed in a non-closed shape, wherein each of the support members includes: a wall capable of elastically deforming by external force in a vertical direction; and at least one tube provided to the wall, and retainers provided to both ends of the connection member, each of the retainers being provided outside of the tube and having an outer diameter larger than an inner diameter of the at least one tube.

In this seventh aspect, the retainers provided to both ends of the connection member reduce the risk of the connection members in a non-closed shape coming off the at least one tube. Hence, even though the walls of the support members elastically deform by the external force in the vertical direction, the connection member does not easily come off the tubes, and the connection member can be stably held by the support members regardless of the degree of the deformation caused by the elastic deformation. Therefore, the shock absorbing member according to the eighth aspect can maintain shock absorbing properties and repulsive force regardless of the degree of the external force.

In an eighth aspect according to the seventh aspect, the wall may deform in parallel with a direction in which the connection member stretches.

Therefore, the shock absorbing member in the eighth aspect can maintain shock absorbing properties and repulsive force in a predetermined direction.

In a ninth aspect of the present disclosure according to the seventh aspect, when receiving external force in a vertical direction, the connection member may sheer-deform by the support member in a direction intersecting with a direction in which the at least one tube extends.

As seen in the seventh aspect, the shock absorbing member according to the ninth aspect can maintain shock absorbing properties and repulsive force regardless of the degree of the external force.

In a tenth aspect of the present disclosure according to the seventh aspect, the tube branches off, at a crimp formed in a middle of the at least one tube, in a different direction toward each end of the tube, and the connection member is bent and provided between tubes including the at least one tube, while inserted through the tubes of the support members.

As seen in the seventh aspect, the shock absorbing member according to the tenth aspect can maintain shock absorbing properties and repulsive force regardless of the degree of the external force.

An eleventh aspect of the present disclosure relates to a shock absorbing member for a sole of a shoe. The shock absorbing member includes: one support member including walls curved to be elastically deformable by external force in a vertical direction, and tubes each provided to a corresponding one of the walls and spaced apart from each other; a connection member laid across, and connecting together, the tubes, the connection member being formed in a non-closed shape; and retainers provided to both ends of the connection member, each of the retainers being provided outside of the tube and having an outer diameter larger than an inner diameter of the at least one tube.

As seen in the seventh aspect, the shock absorbing member according to the eleventh aspect can maintain shock absorbing properties and repulsive force regardless of the degree of the external force.

A twelfth aspect of the present disclosure relates to a shoe including the shock absorbing member according to any one of the first to eleventh aspects, the shock absorbing member being provided in a position corresponding to one of at least a heel or MP joints of a foot of a wearer.

The shoe according to this twelfth aspect can obtain the advantages, similar to those in the first to eleventh aspects, in a position corresponding to a heel or MP joints of foot of a wearer.

As can be seen, the present disclosure can maintain shock absorbing properties and repulsive force regardless of the degree of the external force.

DETAILED DESCRIPTION

Embodiments of the present disclosure will now be described in detail with reference to the drawings. Note that the following description of the embodiments is a mere example in nature, and is not intended to limit the scope, application, or uses of the present invention.

First Embodiment

Figure 1:
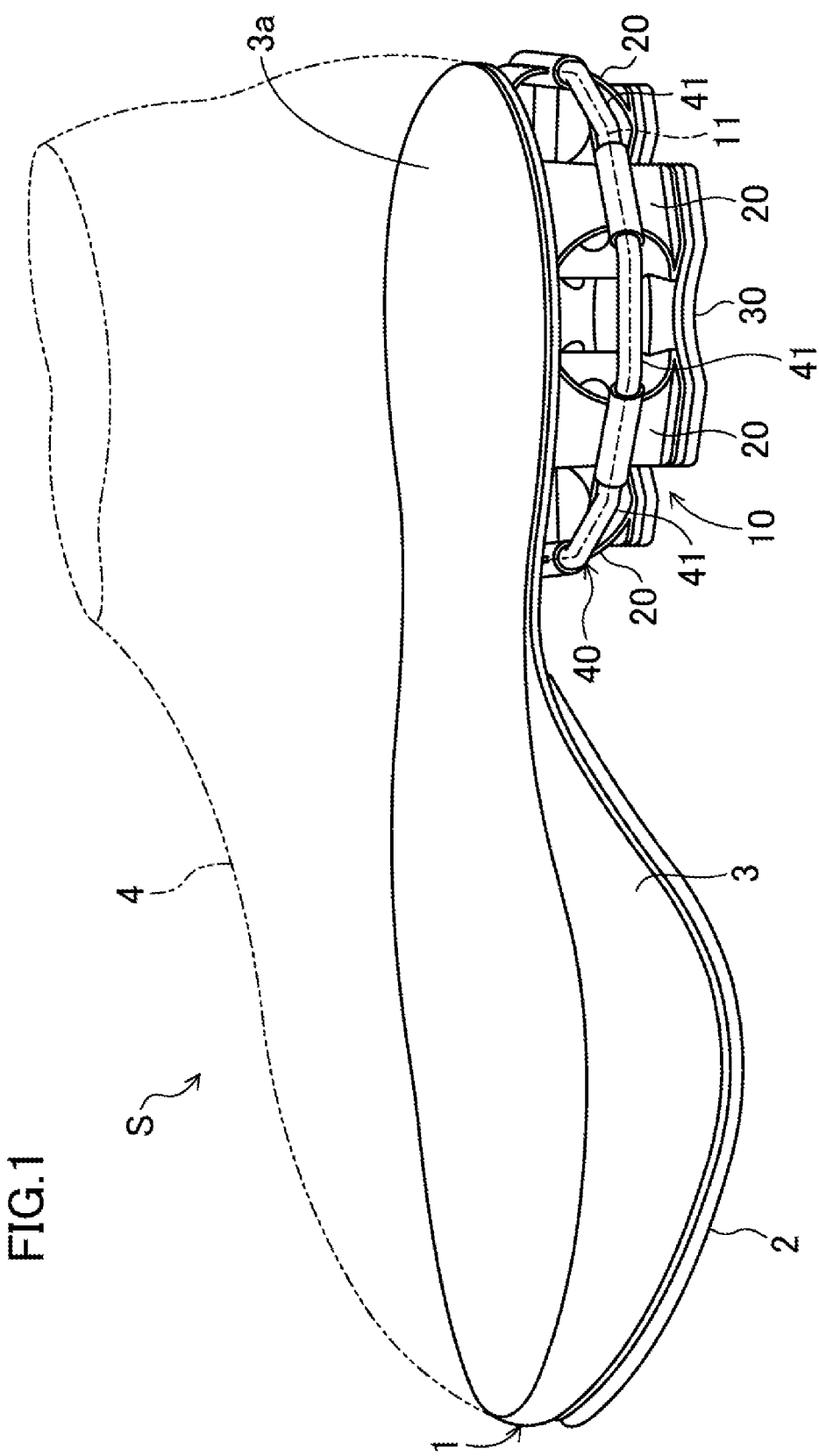
FIG. 1 is a perspective view of a shoe according to a first embodiment of the present disclosure.
Figure 2:
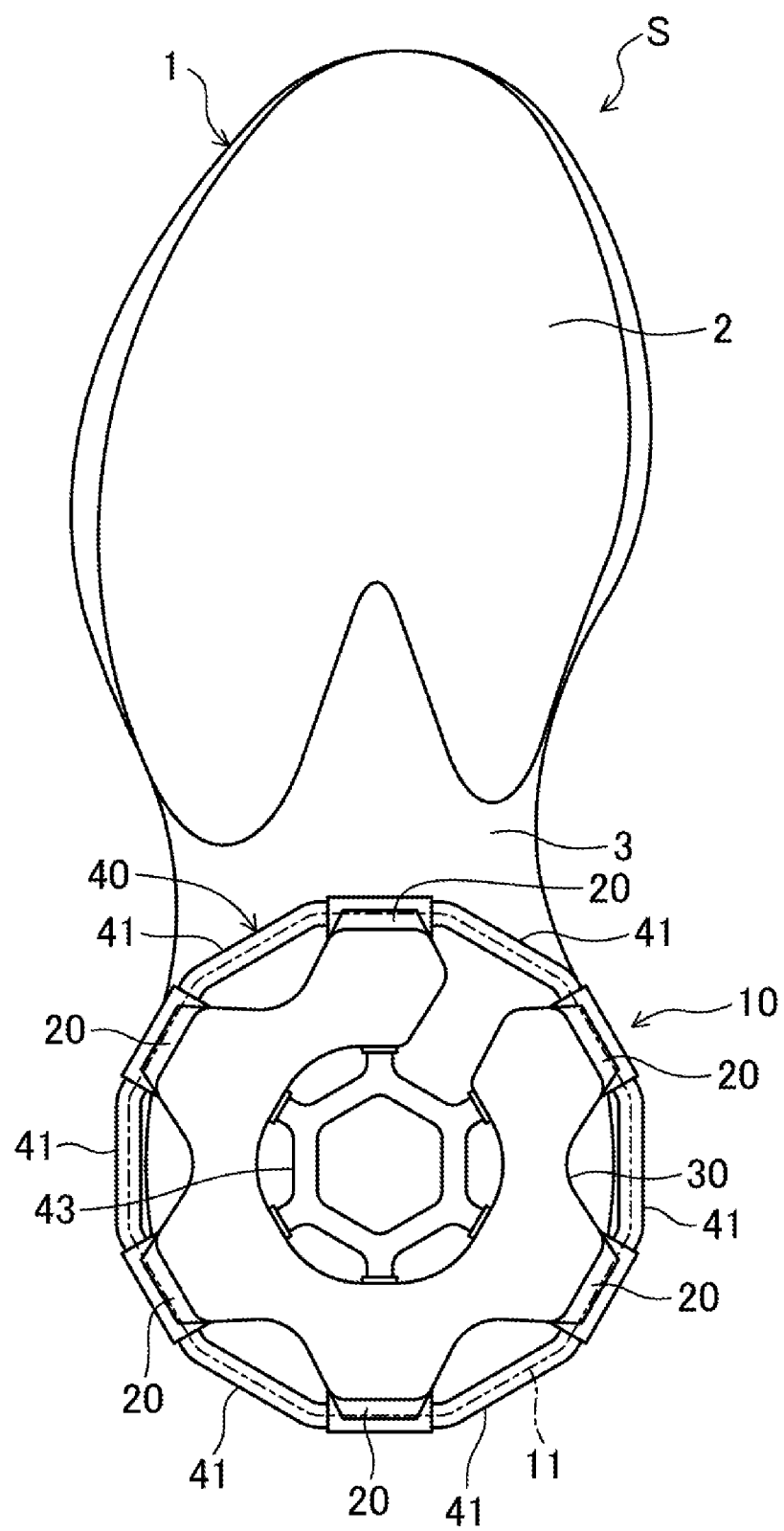
FIG. 2 is a bottom view of the shoe according to the first embodiment of the present disclosure.

FIGS. 1 and 2 generally show a shoe S according to a first embodiment of the present disclosure. The shoe S is applied to, for example, sport shoes used in various kinds of sports such as running and ball games, shoes for daily use, and shoes for rehabilitation.

The drawings illustrate a right shoe S only as an example. Since the left shoe is symmetrical to the right shoe, only the right shoe will be described in the following description, and the description of the left shoe will be omitted herein.

In the following description, the expressions "above," "upward," "on a/the top of," "below," "under," and "downward," represent the vertical positional relationship between respective components of the shoe S. The expressions "front," "fore," "forward," "anterior," "rear," "hind," "behind," "backward," and "posterior" represent the positional relationship in the fore-aft direction between respective components of the shoe S. The expressions "medial side" and "lateral side" represent the positional relationship in the foot width direction between respective components of the shoe S.

As shown in FIGS. 1 and 2, the shoe S has a sole 1. The sole 1 includes an outsole 2 extending over a region from the forefoot to the midfoot of a foot of a person wearing the shoe S (hereinafter referred to as the "wearer"). The outsole 2 is made from a hard elastic material which is harder than the material for a midsole 3, which will be described later. Examples of suitable materials for the outsole 2 include, but are not limited to, thermoplastic resins such as ethylene-vinyl acetate copolymer (EVA), thermosetting resins such as polyurethane (PU), and rubber materials such as butadiene rubber and chloroprene rubber. The outsole 2 has, on its lower surface, a ground surface to make contact with a ground surface (e.g., the ground, a floor, etc.).

The sole 1 further includes the midsole 3 which supports the wearer's plantar surface extending from the forefoot to the hindfoot. The midsole 3 is made of a soft elastic material. Non-limiting suitable examples of the material for the midsole 3 include thermoplastic synthetic resins such as ethylene-vinyl acetate copolymer (EVA) and foams of the thermoplastic synthetic resins, thermosetting resins such as polyurethane (PU) and foams of the thermosetting resins, and rubber materials such as butadiene rubber and chloroprene rubber and foams of the rubber materials.

The midsole 3 is stacked on the outsole 2, while having a lower portion thereof bonded to an upper portion of the outsole 2 with an adhesive or other means. The midsole has, on its upper portion, a planta support 3a which is configured to support the plantar surface of a foot of a wearer. As illustrated in FIG. 1, an upper 4 configured to cover the wearer's foot is attached to the peripheral edge of the midsole (see phantom lines in FIG. 1).

As shown in FIGS. 1 and 2, the shoe S has a shock absorbing member 10. This shock absorbing member 10 is for (i) absorbing shock generated when external force F in the vertical direction (see FIG. 6) is applied to the sole 1, and, while absorbing the shock, (ii) converting distortion energy stored inside the shock absorbing member 10 into repulsive force to provide the repulsive force to the foot of the wearer. In this embodiment, the shock absorbing member 10 is provided to the rear of the sole 1 (the midsole 3). Specifically, the shock absorbing member 10 is provided in a position, in the sole 1, corresponding to the heel of the wearer's foot.

The shock absorbing member 10 has an outer periphery portion formed to be substantially circular or annular in polygon when observed in plan view. In the description below, annular broken lines in each of the drawings are seen as an outer periphery portion 11 for the sake of simplification of illustration of the outer periphery portion 11. Furthermore, the outer periphery portion 11 of each drawing represents a state of support members 20 before receiving the external force F in the vertical direction (see FIG. 6).

Figure 3:
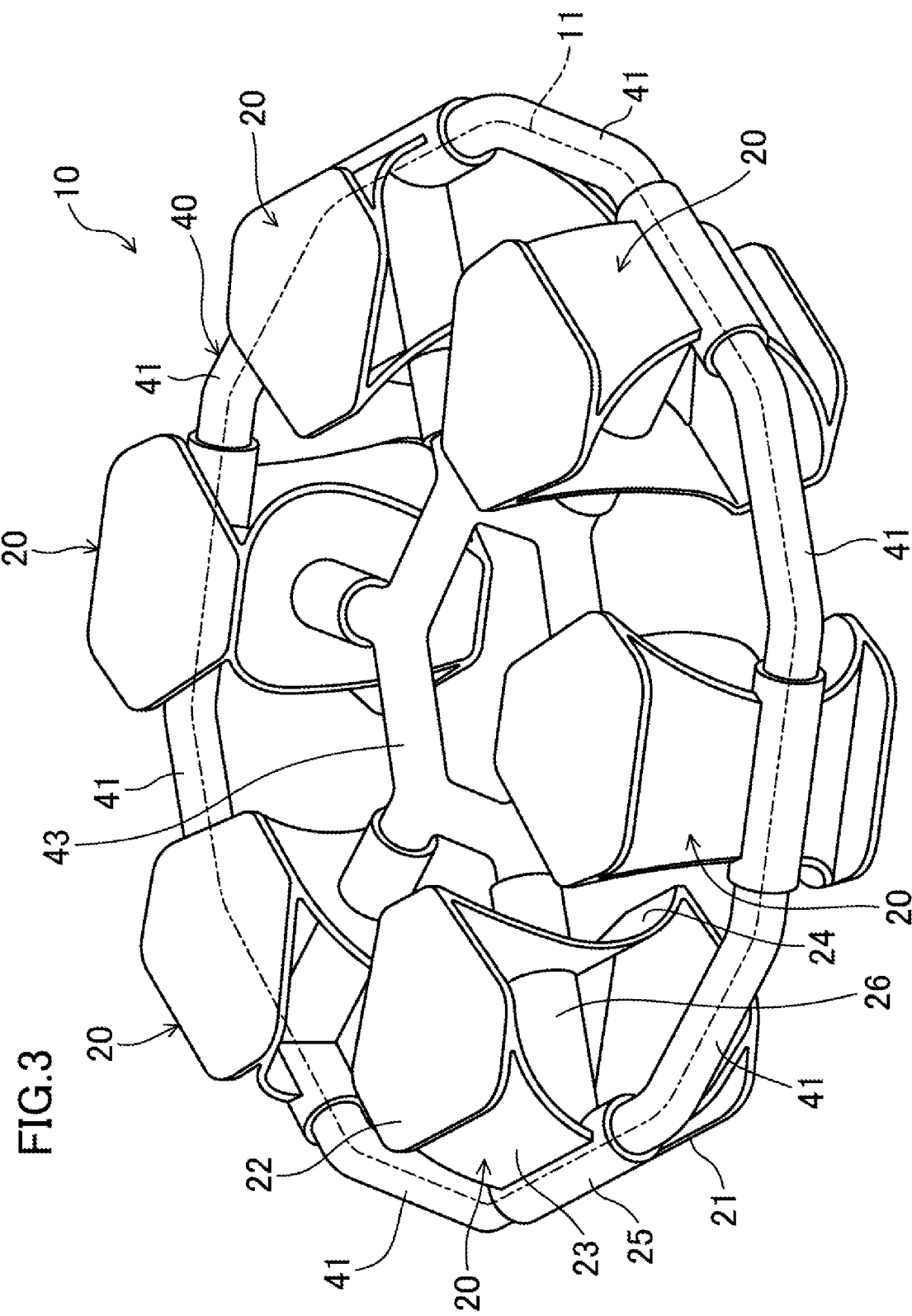
FIG. 3 is a perspective view of a shock absorbing member, as viewed from above.
Figure 6:
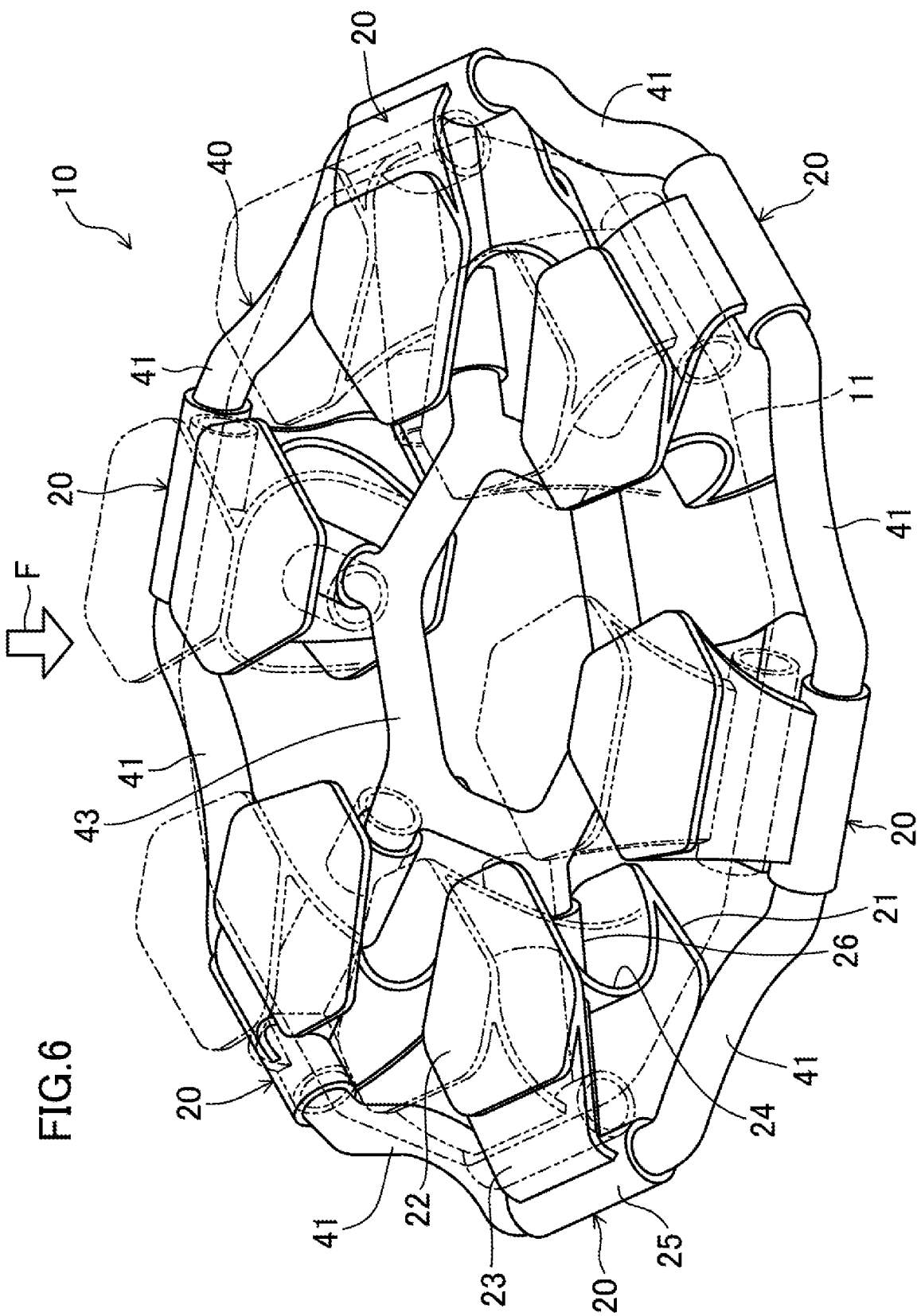
FIG. 6 is a perspective view illustrating how the support member and a connection member deform when external force in a vertical direction is applied to the shock absorbing member.
Figure 7:
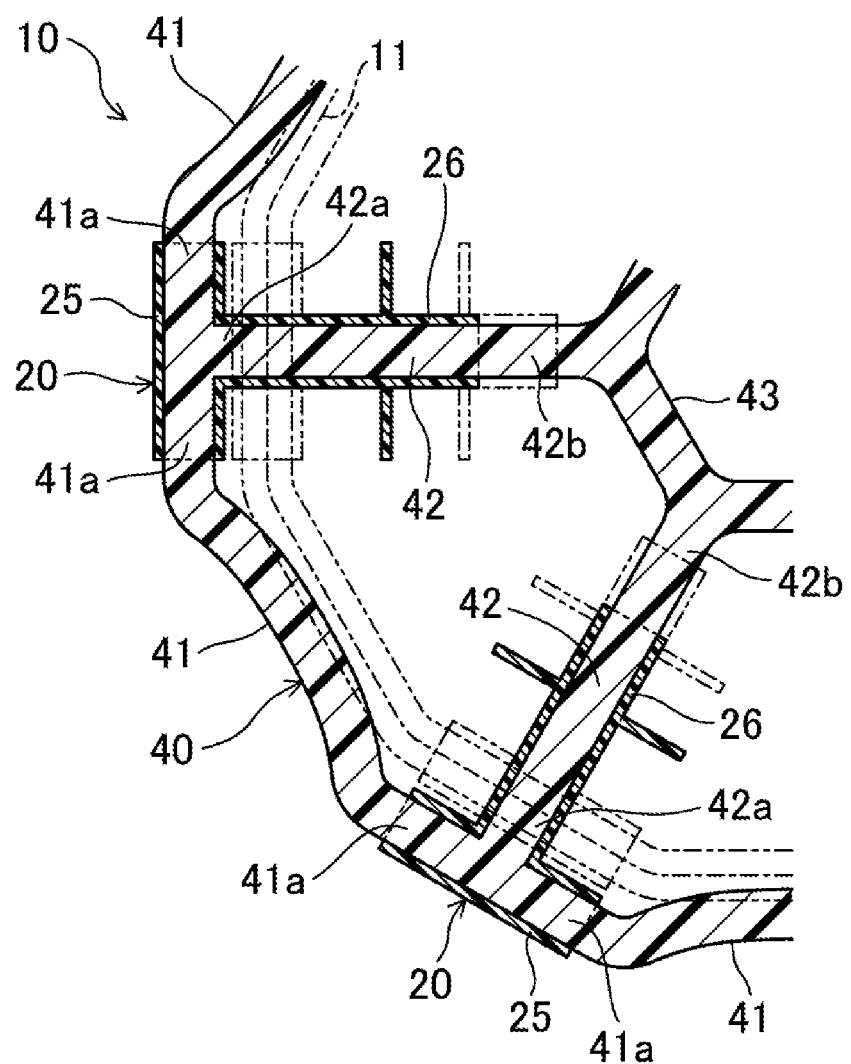
FIG. 7 is a partially enlarged cross-sectional view illustrating how each of the parts of the shock absorbing member deforms when external force is applied in the vertical direction to the shock absorbing member.

As illustrated in FIG. 3, the shock absorbing member 10 includes the support members 20 (six in FIG. 3) for supporting the wearer's foot. The support members 20 are spaced apart from each other along the circumference of the outer periphery portion 11. As illustrated in FIGS. 6 and 7, the support members 20 are configured to be elastically deformable toward the outside of the outer periphery portion 11 when receiving the external force F in the vertical direction. Suitable examples of the support members 20 include resin materials such as polyether block amide (PEBA), polyamide (PA), or thermoplastic polyeurethane (TPU).

Figure 4:
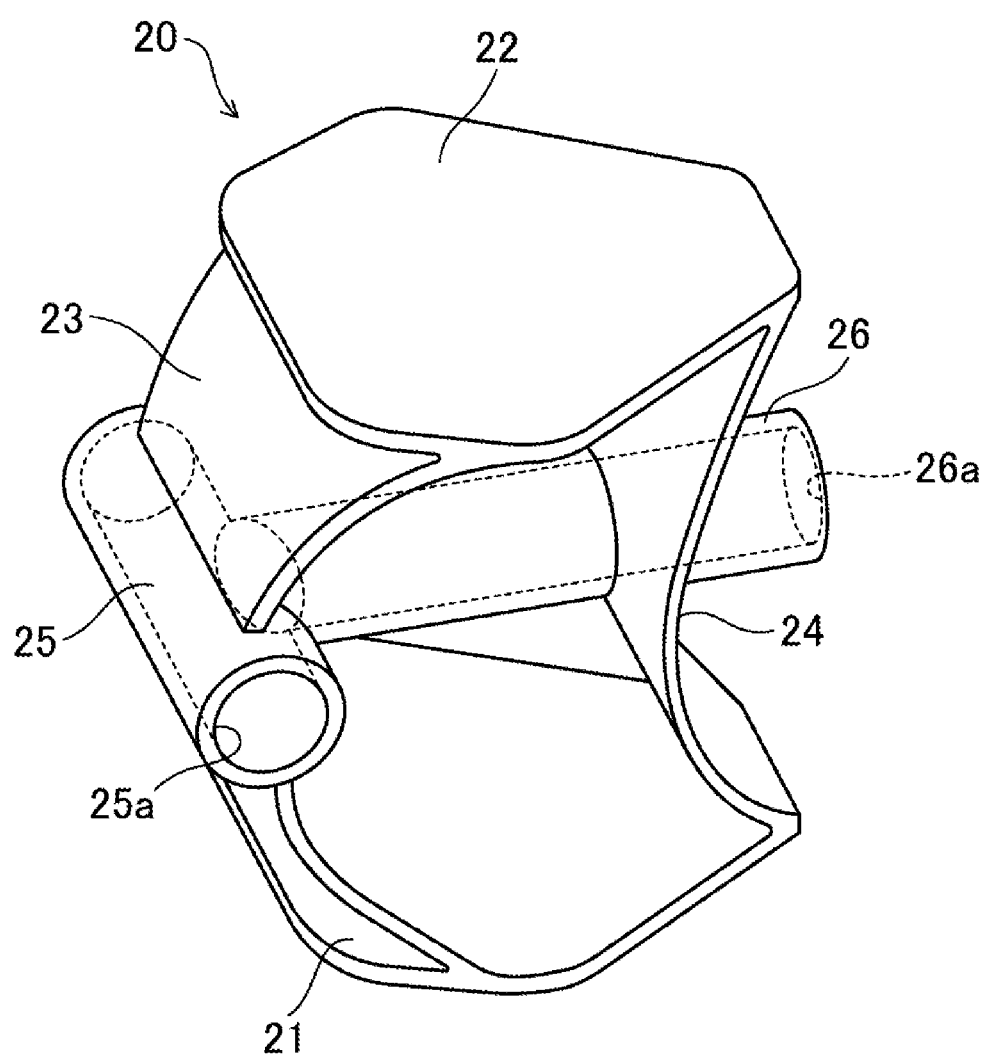
FIG. 4 is a perspective view of a support member, as viewed from above.

As illustrated in FIGS. 3 and 4, each of the support members 20 includes: a bottom plate 21 shaped into a substantial plate and provided toward the ground (below the sole 1); and a top plate 22 shaped into a substantial plate and provided above the bottom plate 21. The top plate 22 is spaced apart from the bottom plate 21. Moreover, in a vertical clearance between the bottom plate 21 and the top plate 22, an outer wall 23 and an inner wall 24, each shaped into a substantial plate, are provided. The outer wall 23 and inner wall 24 are integrally formed with the bottom plate 21 and the top plate 22.

The outer wall 23 is provided toward the outer periphery portion 11; whereas, the inner wall 24 is provided inward from the outer periphery portion 11. Specifically, the outer wall 23 and the inner wall 24 are spaced apart from and face each other along a radius of the outer periphery portion 11.

Moreover, in a side view, the outer wall 23 and the inner wall 24 are curved so that a substantial center of each of the outer wall 23 and the inner wall 24 in the vertical direction protrudes toward the outside of the outer periphery 11.

Moreover, as illustrated in FIGS. 3 and 4, each support member 20 has a first tube 25 and a second tube 26 both of which are cylindrical. The first tube 25 is provided to the substantial center of the outer wall 23 in the vertical direction. The second tube 26 is provided to the substantial center of the inner wall 24 in the vertical direction.

The first tube 25 extends along the circumference of the outer periphery portion 11. The first tube 25 is integrally formed with the outer wall 23 at the substantial center of the outer wall 23 in the vertical direction. Inside the first tube 25, a through hole 25a whose cross section is substantially circular is formed along the circumference of the outer periphery portion 11.

The second tube 26 is provided orthogonally to the longitudinal direction of the first tube 25, and extends radially inward of the outer periphery portion 11. The second tube 26 is formed integrally with the first tube 25 and the inner wall 24 while an end of the second tube 26, toward the outer periphery portion 11, communicates with the first tube 25. Inside the second tube 26, a through hole 26a whose cross section is substantially circular is formed along the radius of the outer periphery portion 11.

As illustrated in FIGS. 1 and 2, the shock absorbing member 10 further includes a backing plate 30 provided below the support members 20, and laid across the neighboring support members 20. Specifically, the backing plate 30 is shaped into a substantial plate, and has a top face bonded with, for example, adhesive to a bottom face of the bottom plate 21 of the support member 20.

Next, as illustrated in FIGS. 1 to 3, the shock absorbing member 10 includes a connection member 40. The connection member 40 is integrally formed by, for example, injection molding.

Figure 5:
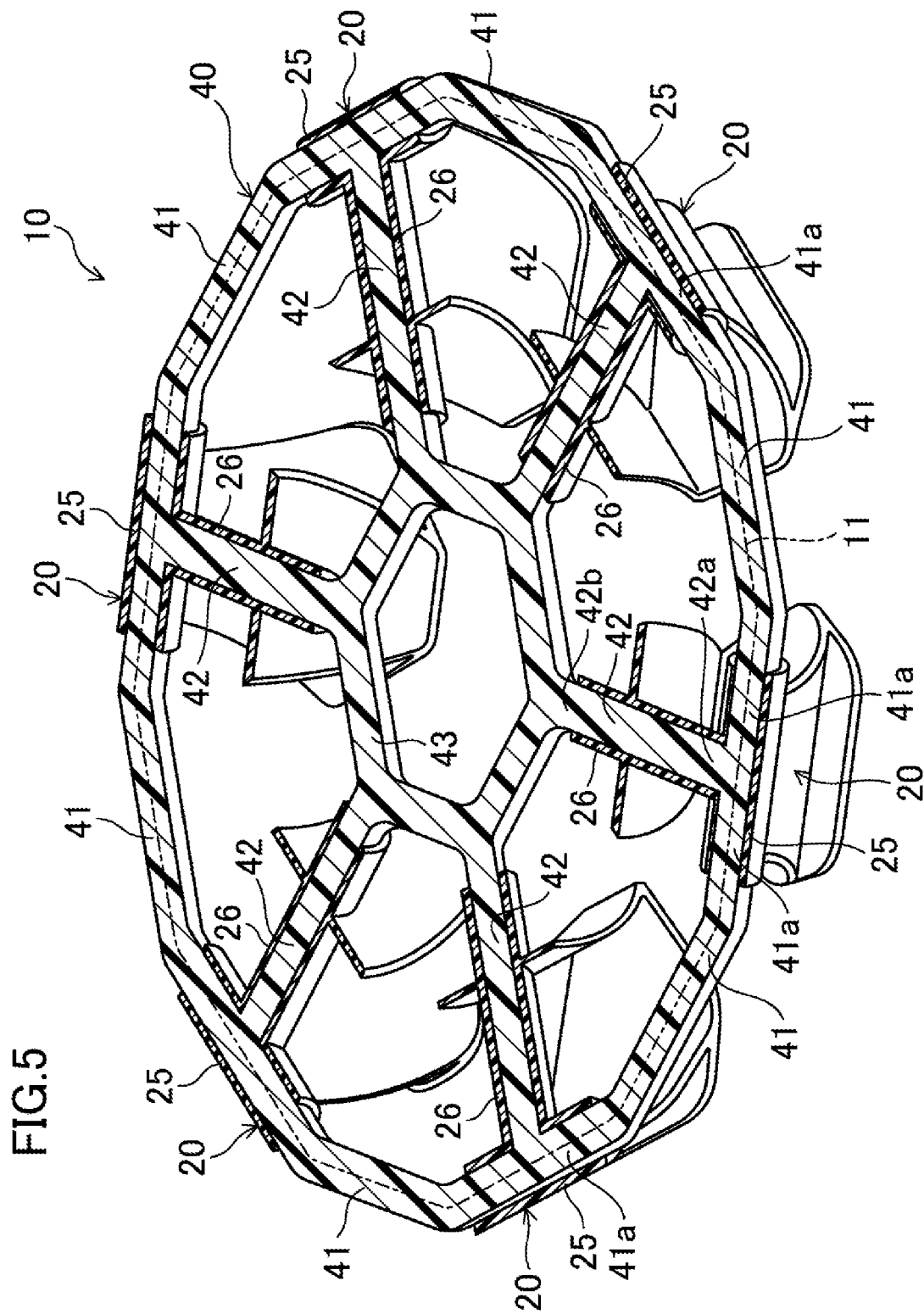
FIG. 5 is a cross-sectional view illustrating a side cross section of the shock absorbing member, as viewed from above.

As illustrated in FIGS. 5 to 7, the connection member 40 is laid across, and connects together, the support members 20. Moreover, the connection member 40 is configured to be elastically deformable by the external force F (see FIG. 6) in response to the elastic deformation of the support members 20. Specifically, an elastic range of the material of the connection member 40 is larger than an elastic range of the material of the support member 20. Suitable examples of the connection member 40 include resin materials such as PEBA and TPU, and rubber materials such as synthetic rubber.

The connection member 40 includes first connections 41 and second connections 42. The first connections 41 and the second connections 42 are each shaped into a bar whose cross section is, for example, substantially circular.

Each of the first connections 41 extends, between the neighboring support members 20, along the circumference of the outer periphery portion 11. Each first connection 41 is provided to, and connects together, the neighboring support members 20. Specifically, as illustrated in FIGS. 5 and 7, each of the first connections 41 is provided to the support members 20 while opposing side-ends 41a of the first connection 41 are inserted through the first tube 25.

Moreover, the first connections 41 are integrally formed to be substantially annular in plan view. Specifically, the first connections 41 are formed integrally so that a side-end 41a of one first connection 41 is continuous to (i.e., seamlessly connected to) a side-end 41a of another first connection 41 neighboring the one first connection 41 in the (associated) first tube 25.

The second connections 42 extend radially inward from the circumference of the outer periphery portion 11. Moreover, the second connections 42 are provided to the support members 20. Specifically, each of the second connections 42 is provided to a corresponding one of the support members 20 while a portion, of the second connection 42, including an outer end 42a and located close to the outer periphery portion 11 is inserted through the second tube 26. The outer end 42a is continuous to the side-end 41a of the first connection 41 in the first tube 25 and the second tube 26. Specifically, each of the second connections 42 is integrally formed so that the outer end 42a is seamlessly connected to the side-end 41a of the first connection 41 while each second connection 42 is inserted through a corresponding one of the second tubes 26 of the support members 20.

The second connections 42 are connected to each other inside the outer periphery portion 11. Specifically, the second connections 42 are configured so that inner ends 42b located inside the outer periphery 11 are connected to each other. In this embodiment, a third connection 43, shaped in a substantially hexagonal ring in plan view is provided inward of the outer periphery portion 11. Each of the inner ends 42b is continuously connected to a corresponding one of the tips of the third connection 43.

Because of such a configuration, while inserted through the first tube 25 and the second tube 26 of each support member 20, the connection member 40 is integrally formed in a closed shape with the ends of the connection member 40 having no seams.

Then, when the external force F in the vertical direction is applied to the shock absorbing member 10 as illustrated in FIG. 6, the top plates 22 of the respective support members 20 are pressed down toward the bottom plates 21, and the substantial center of each of the outer walls 23 and the inner walls 24 in the vertical direction bends outward of the outside of the outer periphery 11. Specifically, each of the support members 20 elastically deforms as the outer wall 23 and the inner wall 24 bend outward of the outer periphery 11 by the external force F in the vertical direction. In this state, as the outer wall 23 and the inner wall 24 bend, the first tube 25 and the second tube 26 move outward of the outer periphery 11.

As illustrated in FIGS. 6 and 7, when the support members 20 elastically deform, receiving the external force F, the first connections 41 are pulled between the support members 20 along the circumference of the outer periphery portion 11. Specifically, each of the first tubes 25 moves radially outward of the outer periphery portion 11, and, in the first connection 41, the opposing side-ends 41a moves radially outward of the outer periphery portion 11 in response to the deformation of each support member 20. Hence, the first connection 41 elastically deforms such that an intermediate portion of the first connection 41 stretches between the support members 20 along the circumference of the outer periphery portion 11.

Meanwhile, when each of the support members 20 elastically deforms, receiving the external force F, the second connection 42 is pulled outward of the outer periphery portion 11. Specifically, an intermediate portion of the second connection 42 including the outer end 42a moves radially outward of the outer periphery portion 11 with respect to the inner ends 42b continuous to the third connection 43, and elastically deforms so that an intermediate portion, of the second connection 42, including the outer end 42a moves radially outward of the outer periphery portion 11.

Advantages of First Embodiment

As described above, in the shock absorbing member 10, (i) the first tube 25 and the second tube 26 provided to the walls (the outer wall 23 and the inner wall 24) move radially outward of the outer periphery portion 11 in response to the elastic deformation by the external force F in the vertical direction of the outer wall 23 and the inner wall 24 for each support member 20, and (ii) the connection member 40 inserted through the first tube 25 and the second tube 26 moves in the same direction as the first tube 25 and the second tube 25 move. While inserted through the first tube 25 and the second tube 26 of the support member 20, the connection member 40 is integrally formed in a closed shape with the ends of the connection member 40 having no seams. Thus, even if the outer wall 23 and the inner wall 24 of each support member 20 elastically deform by the external force F in the vertical direction, the connection member 40 does not easily come off the first tube 25 and the second tube 26. Specifically, even if the outer wall 23 and the inner wall 24 of each support member 20 elastically deform by the external force F, the connection member 40 can be stably held by each support member 20 regardless of the degree of the deformation. Therefore, the shock absorbing member 10 according to the first embodiment of the present disclosure can maintain shock absorbing properties and repulsive force regardless of the degree of the external force F.

Moreover, the elastic range of the material of the connection member 40 is configured to be wider than the elastic range of the material of the support member 20. Hence, when the external force F in the vertical direction is applied to each support member 20, the outer wall 23 and the inner wall 24 of the support member 20 are distorted by bent and deformation; whereas, the connection member 40 is distorted by pulling force generated when the first tube 25 and the second tube 26 of each support member 20 move radially outward from the outer periphery portion 11. In this state, since the connection member 40 is made of a material whose elastic range is relatively wide (i.e., small in resilience decrease), the connection member 40 is restored faster than the support members 20 are. As a result the resilience of the connection member 40 helps the support members 20 restore themselves. Compared with the case where the support members 20 are restored by themselves, such a feature makes it possible to further enhance the repulsive force of the shock absorbing member 10. Note that, when having a large distortion by deformation, a typical resin material shows a decrease in resilience (restoration speed). Moreover, a resin material with a narrow elastic range shows such a decrease in further degree.

Moreover, when the support member 20 elastically deforms, receiving the external force F in the vertical direction, each of the first and second connections 41 and 42 are pulled in the respective longitudinal directions. Hence, shock absorbing properties are observed less unevenly and the support members 20 do not excessively deform. Moreover, when the external force F is not applied to the support members 20, the first and second connections 41 and 42 generate resilience with which the first and second connections 41 and 42 return from a stretched state in which the first and second connections 41 and 42 are pulled in the respective longitudinal direction to a contracted state. In addition, the resilience of the first and second connections 41 and 42 contributes to the resilience of the support members 20. In particular, the resilience generated in the first connections 41 mutually contributes to the resilience of the neighboring support members 20. Such features further enhance the repulsive force of the shock absorbing member 10. Therefore, the shock absorbing member 10 can exert greater shock absorbing properties and repulsive force.

Moreover, each of the first connections 41 is provided to the support member 20 while the opposing side-ends 41a are inserted through the first tube 25, and each of the second connections 42 is provided to the support member 20 while the outer end 42a is inserted through the second tube 26. Hence, the first and second connections 41 and 42 do not easily come off the support member 20 thanks to the first and second tubes 25 and 26. Such features make it possible to enhance connection between the support member 20 and the first and second connections 41 and 42.

Moreover, the backing plate 30 applies the external force F in the vertical direction substantially equally among the support members 20, contributing to reduction in uneven shock absorbing properties.

Moreover, when the shock absorbing member 10 is provided to a position in the sole 1 corresponding to a heel portion of the wearer's foot, a shoe with the shock absorbing member 10 can obtain advantages, similar to those in this embodiment, in a position corresponding to the heel portion of the wearer's foot.

Variation of First Embodiment

Figure 8:
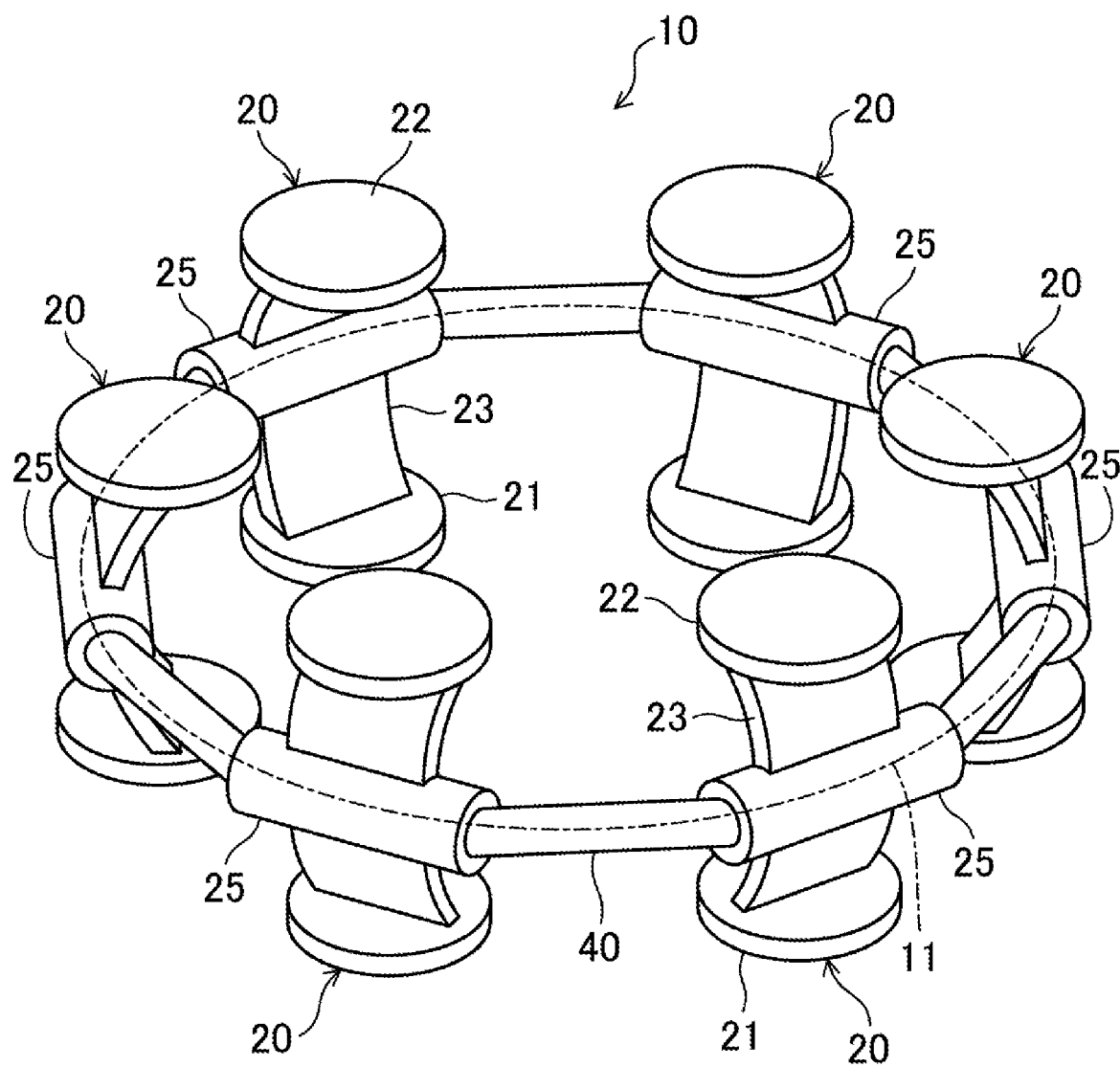
FIG. 8 is a perspective view illustrating a modification of the shock absorbing member according to the first embodiment, as viewed from above.

FIG. 8 illustrates a variation of the shock absorbing member 10 according to the first embodiment of the present disclosure. As illustrated in FIG. 8, in a vertical clearance between the bottom plate 21 and the top plate 22 of each support member 20, the outer wall 23 and the first tube 25 are provided. The configurations of the outer wall 23 and the first tube 25 are similar to those described in the first embodiment, and the details thereof shall be omitted. On the other hand, each support member 20 in this variation is not provided with the inner wall 24 and the second tube 26 described in the first embodiment.

Moreover, the connection member 40 in this variation is not provided with the second connections 42 and the third connection 43 described in the first embodiment. The connection member 40 includes the first connections 41 alone. The connection member 40 in this variation is similar in configuration to the first connections 41 described in the first embodiment, and details thereof shall be omitted. In this variation, the shock absorbing member 10 does not include the backing plate 30. However, this is merely a non-limiting example. The shock absorbing member 10 may include the backing plate 30.

As described above, in the shock absorbing member 10 according to the variation, (i) the first tubes 25, provided to the outer walls 23, move radially outward of the outer periphery portion 11 in response to the elastic deformation, by the external force in the vertical direction, of the outer walls 23 for each support member 20, and (ii) the connection member 40 inserted through the first tubes 25 moves in the same direction as the first tubes 25 move. While inserted through the first tubes 25, the connection member 40 is integrally formed in a closed shape with the ends of the connection member 40 having no seams. Thus, even if the outer wall 23 of each support member 20 elastically deforms by the external force in the vertical direction, the connection member 40 does not easily come off the first tubes 25. Specifically, even if the outer wall 23 of each support member 20 elastically deforms by the external force F, the connection member 40 can be stably held by the support members 20 regardless of the degree of the deformation. Therefore, the shock absorbing member 10 according to this variation can maintain shock absorbing properties and repulsive force regardless of the degree of the external force in the vertical direction, as can be seen in the first embodiment.

Other Embodiments in the First Embodiment

In the first embodiment, the shock absorbing member 10 is provided to, but not limited to, a position in the sole 1 corresponding to a heel portion of the wearer's foot. For example, the shock absorbing member 10 is provided in a position in the sole 1 corresponding to the metacarpophalangeal (MP) joints of the wearer's foot. Such a feature makes it possible to provide the same advantages, seen in the above embodiment, in a position corresponding to MP joints of the wearer's foot.

Moreover, the shock absorbing member 10 according to the first embodiment includes, but is not limited to, six support members 20 in the examples of the drawings. Specifically, the shock absorbing member 10 may include at least two or more support members 20. More preferably, the shock absorbing member 10 may include at least three or more support members 20 spaced apart from each other along the circumference of the outer periphery portion 11.

In addition, the first embodiment describes the connection member 40 including, but not limited to, the first connections 41 and the second connections 42. Specifically, the connection member 40 may include either one kind of the connections; that is, the first connections 41 or the second connections 42. In such a case, each of the support members 20 may be provided with either one of the first tube 25 or the second tube 26.

Furthermore, the first embodiment describes the inner end 42b of each of the second connection 42 continuously connected to a corresponding one of apexes of the third connection 43. However, this is merely a non-limiting example. For example, without the third connection 43, the inner ends 42b of the connections 42 may directly be connected to each other.

Moreover, the first embodiment describes the backing plate 30 provided, but not limited to, below the support members 20. For example, the backing plate 30 may be provided only above the support members 20. Alternately, multiple backing plates 30 may be provided to both sides of the support members 20; namely, above and below the support members 20. Moreover, the backing plate 30 may be omitted.

Second Embodiment

Figure 9:
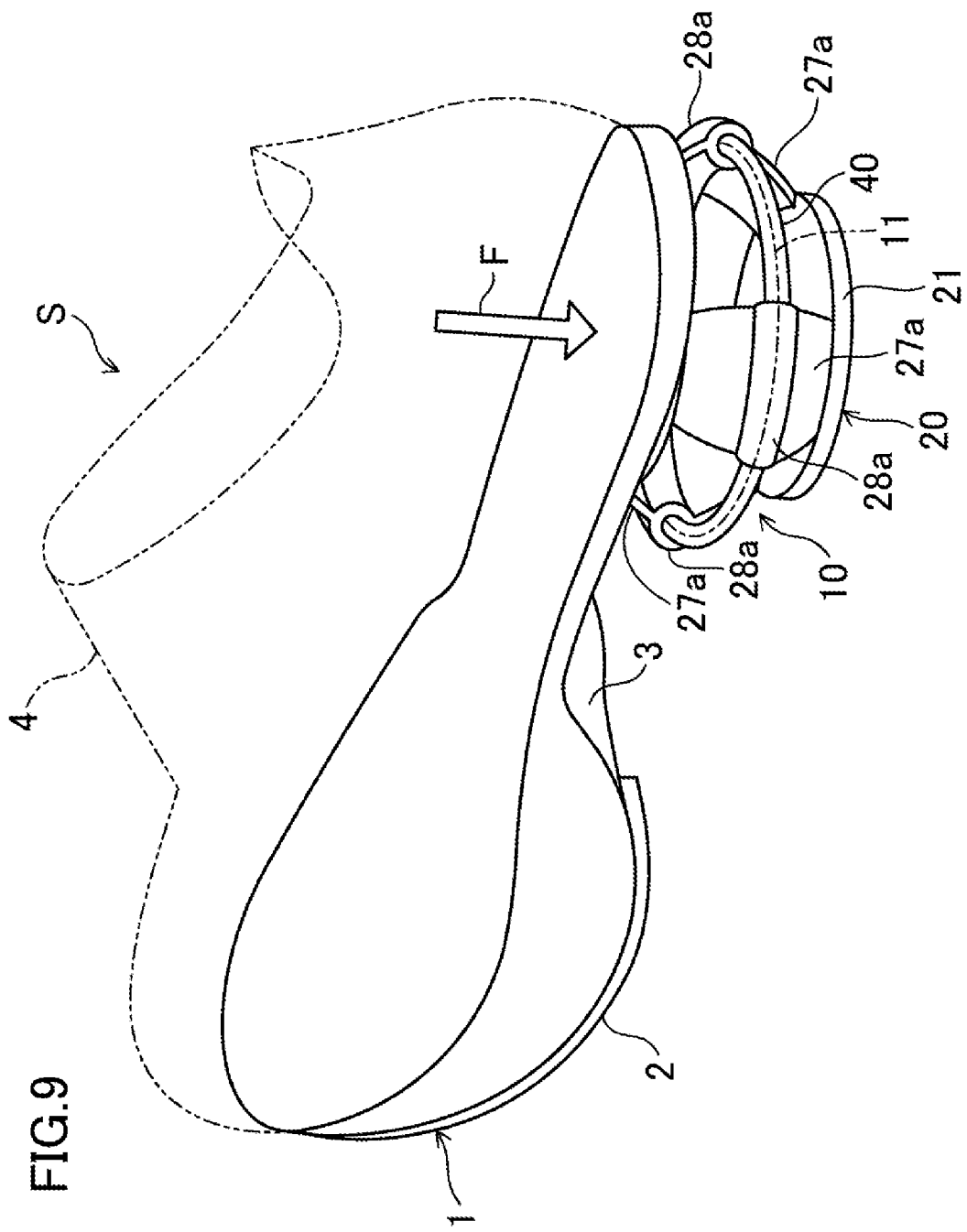
FIG. 9 is a perspective view of a shoe according to a second embodiment of the present disclosure.
Figure 10:
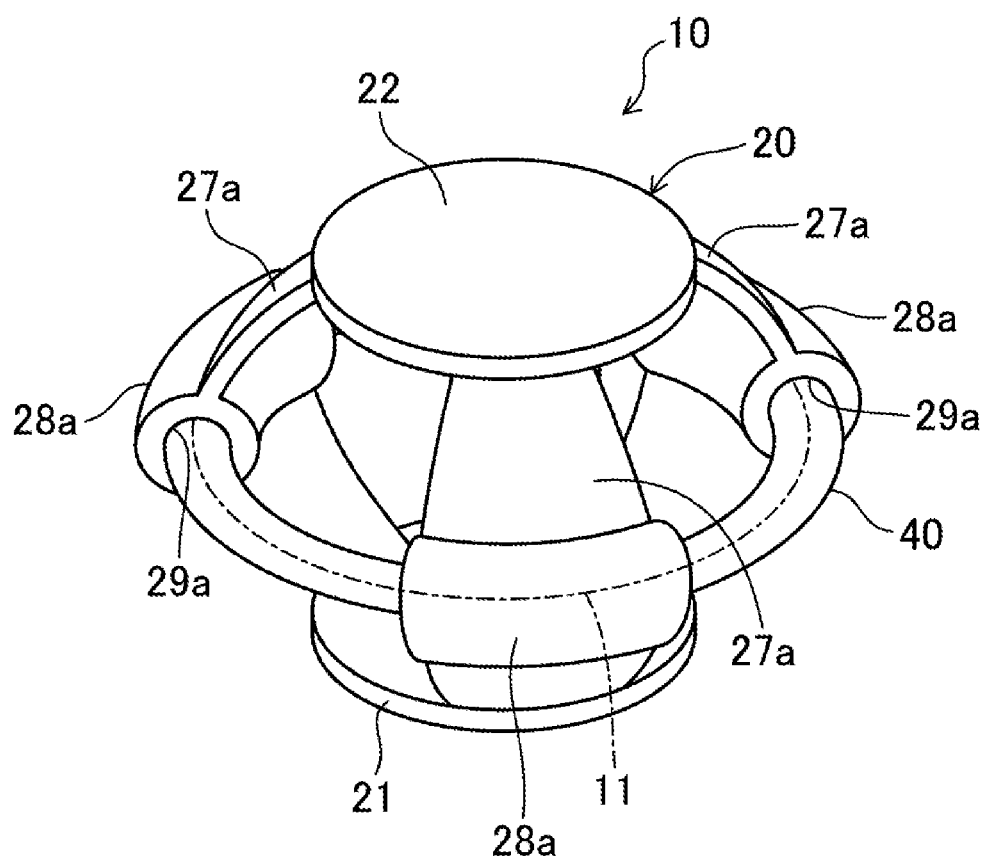
FIG. 10 is a perspective view illustrating a shock absorbing member according to the second embodiment, as viewed from above.

FIGS. 9 and 10 illustrate the shock absorbing member 10 according to a second embodiment of the present disclosure. The second embodiment is different in configurations of the support member 20 and the connection member 40 from the first embodiment. Note that other configurations of the shock absorbing member 10 according to the second embodiment are the same as those of the shock absorbing member 10 according to the first embodiment. Therefore, elements that are the same as those shown in FIGS. 1 to 7 are denoted by the corresponding reference characters, and a detailed description thereof is omitted herein.

As illustrated in FIGS. 9 and 10, the shock absorbing member 10 according to the second embodiment is formed in a substantially annular shape in plan view. Moreover, the shock absorbing member 10 includes a single support member 20. As seen in the first embodiment, the support member 20 includes the bottom plate 21 and the top plate 22. Each of the bottom plate 21 and the top plate 22 is formed in a disc shape.

In a virtual clearance between the bottom plate 21 and the top plate 22, multiple walls 27a (three in the exemplary drawings) are provided. The walls 27a are spaced apart from each other along the circumference of the outer periphery portion 11. Each of the walls 27a is integrally formed with the bottom plate 21 and the top plate 22. Each wall 27a is curved so that a substantial center of the outer wall 27a in the vertical direction protrudes toward the outside of the shock absorbing member 10.

The support member 20 includes multiple tubes 28a (three in the exemplary drawings). Each of the tubes 28a is provided to the substantial center of a corresponding one of the wall 27a in the vertical direction. Each tube 28a curbs and extends along the circumference of the outer periphery portion 11. The tube 28a is integrally formed with a corresponding one of the walls 27a at the substantial center of the wall 27a in the vertical direction. Inside the tube 28a, a through hole 29a whose cross section is substantially circular is formed along the circumference of the outer periphery portion 11.

The connection member 40 extends between the neighboring tubes 28a along the circumference of the outer periphery portion 11. Specifically, the connection member 40 is integrally formed with the tubes 28a, while passing through the through hole 29a of each of the tube 28a. While inserted through the tubes 28a, the connection member 40 is formed in a closed shape with the ends of the connection member 40 having no seams.

In the shock absorbing member 10 of this second embodiment, (i) the tubes 28a moves radially outward of the outer periphery portion 11 in response to the elastic deformation, by the external force F in the vertical direction (see FIG. 9), of the walls 27a for the support member 20, and (ii) the connection member 40 inserted through the tubes 28a moves in the same direction as the tubes 28a move. While inserted through the through holes 29a of the tubes 28a, the connection member 40 is integrally formed in a closed shape with the ends of the connection member 40 having no seams. Thus, even if the outer walls 27a of the support member 20 elastically deforms by the external force F in the vertical direction, the connection member 40 does not easily come off the tubes 28a. Specifically, even if the walls 27a of the support member 20 elastically deform by the external force F, the connection member 40 can be stably held by the support member 20 regardless of the degree of the deformation. Therefore, the shock absorbing member 10 according to the second embodiment can maintain shock absorbing properties and repulsive force regardless of the degree of the vertical external force F, as can be seen in the first embodiment.

Third Embodiment

Figure 11:
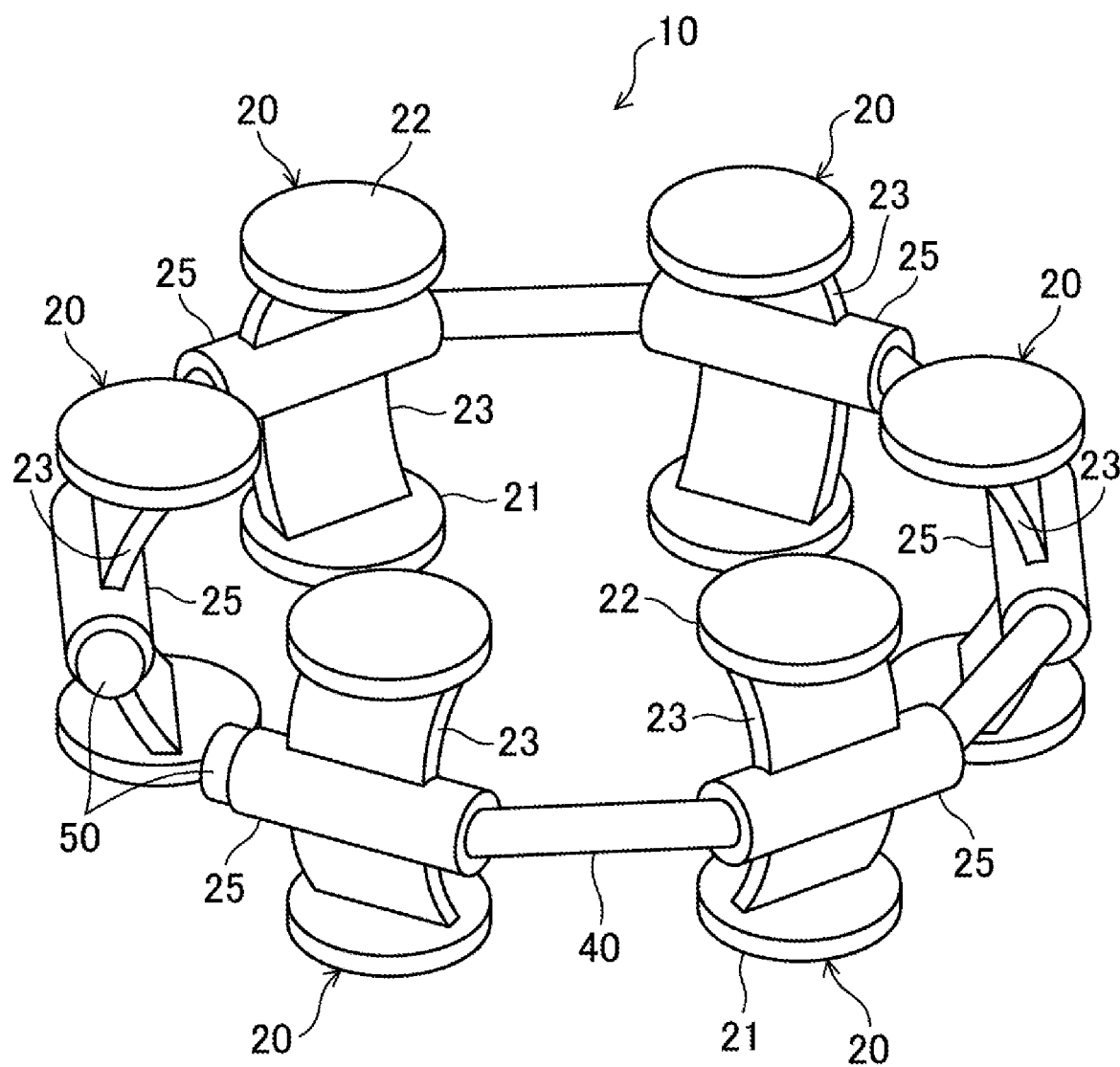
FIG. 11 is a perspective view illustrating a shock absorbing member according to a third embodiment, as viewed from above.

FIG. 11 illustrates the shock absorbing member 10 according to a third embodiment of the present disclosure. The third embodiment is different in some configurations of the connection member 40 from the variation of the first embodiment. Note that other configurations of the shock absorbing member 10 according to this embodiment are the same as those of the shock absorbing member 10 according to the variation of the first embodiment. Therefore, elements that are the same as those shown in FIG. 8 are denoted by the corresponding reference characters, and a detailed description thereof is omitted herein.

As illustrated in FIG. 11, the connection member 40 of the shock absorbing member 10 according to the third embodiment is different in shape from the connection member 40, described in the variation of the first embodiment, formed in a closed shape. Specifically, the connection member 40 according to the third embodiment is formed in a non-closed shape; that is, the connection member 40 according to the variation of the first embodiment is partially open.

Both ends of the connection member 40 are provided with retainers 50. The retainers 50 are provided outside of the first tubes 25 located on both ends of the connection member 40. The retainers 50 are spaced apart from, and face, each other along the circumference of the connection member 40. Each of the retainers 50 has an outer diameter larger than an inner diameter of the through hole 25a for each of the first tube 25.

In this case, the retainer 50 located in the left of FIG. 11 is formed in a substantial sphere; whereas, the retainer 50 located in the right of FIG. 11 is formed in a substantial disc. Note that the shapes of the retainers 50 are not limited to such shapes. Alternatively, the retainers 50 may be formed in various shapes.

As described above, in the shock absorbing member 10 according to the third embodiment, the retainers 50 provided to both ends of the connection member 40 reduce the risk of the connection member 40 in a non-closed shape coming off the first tubes 25. Hence, even though the outer walls 23 of the support members 20 elastically deform by the external force in the vertical direction, the connection member 40 does not easily come off the first tubes 25, and the connection member 40 can be stably held by the support members 20 regardless of the degree of the deformation caused by the elastic deformation. Therefore, the shock absorbing member 10 according to the third embodiment of the present disclosure can maintain shock absorbing properties and repulsive force regardless of the degree of the external force in the vertical direction.

Forth Embodiment

FIGS. 12 to 15 illustrate the shock absorbing member 10 according to a fourth embodiment of the present disclosure. The fourth embodiment is different in specific configurations of the support member 20 and the connection member 40 from the first embodiment. Note that other configurations of the shock absorbing member 10 according to this embodiment are the same as those of the shock absorbing member 10 of the first embodiment. Therefore, elements that are the same as those shown in FIGS. 1 to 7 are denoted by the corresponding reference characters, and a detailed description thereof is omitted herein.

Figure 13:
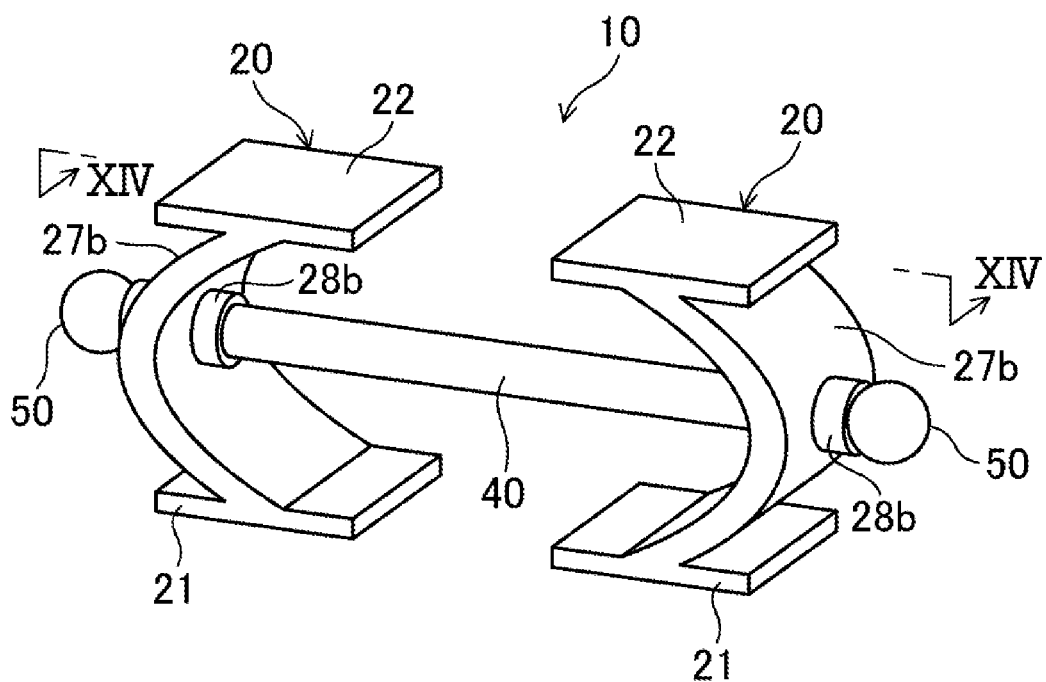
FIG. 13 is a perspective view illustrating a shock absorbing member according to the fourth embodiment, as viewed from above.
Figure 14:
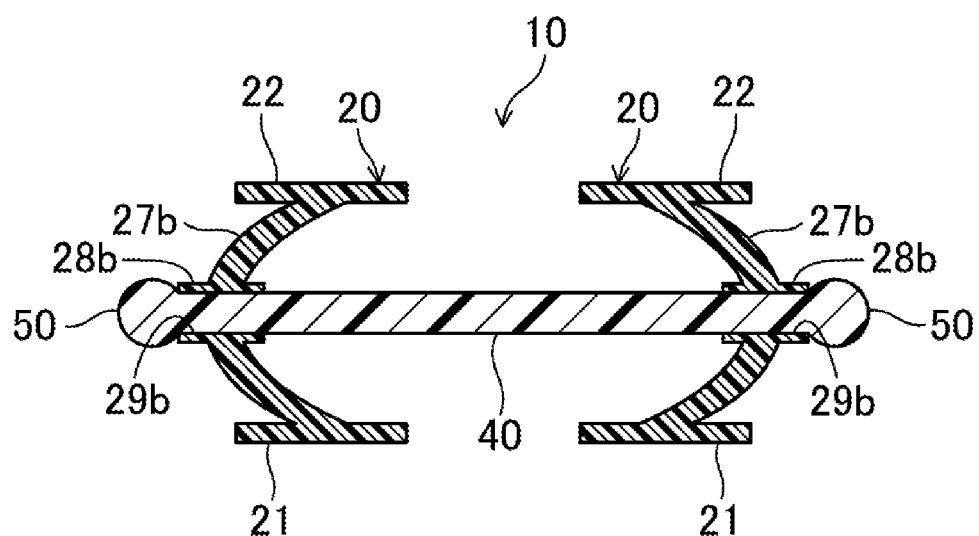
FIG. 14 is a cross-sectional view taken along line XIV-XIV in FIG. 13.
Figure 15:
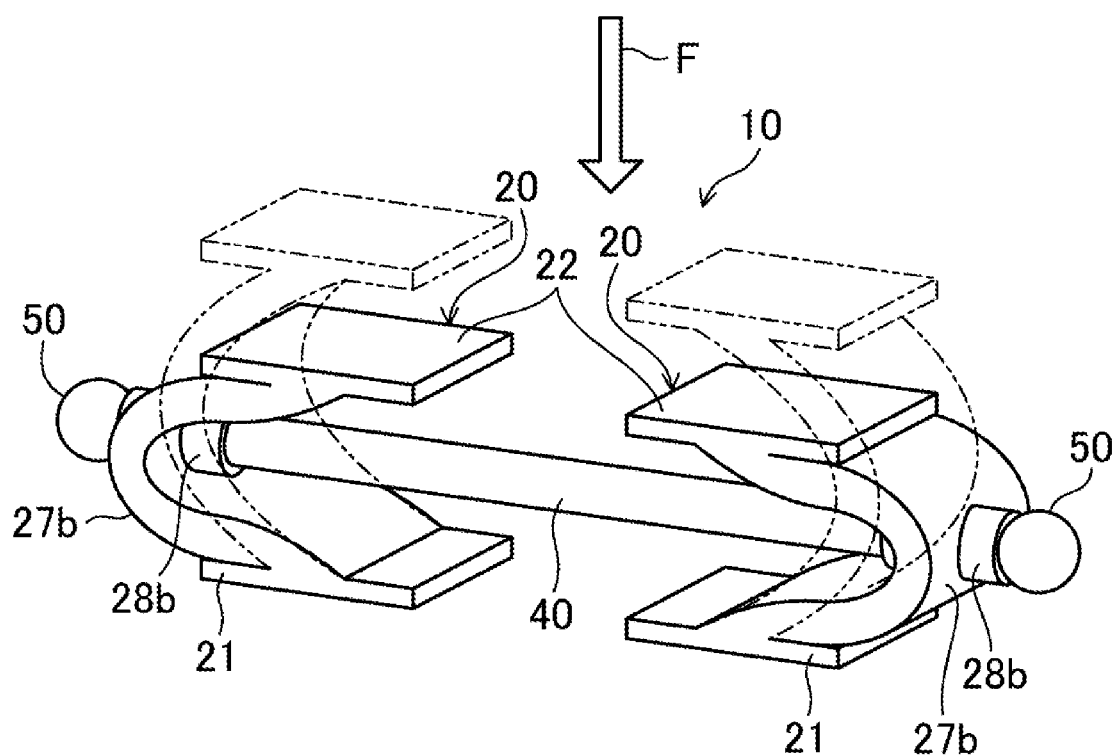
FIG. 15 is a perspective view illustrating how support members and a connection member deform when external force in a vertical direction is applied to the shock absorbing member according to the fourth embodiment.

As illustrated in FIGS. 13 to 15, the shock absorbing member 10 according to the fourth embodiment include two support members 20. The support members 20 are arranged so that walls 27b of the support members 20 face each other.

As seen in the first embodiment, each of the support members 20 includes the bottom plate 21 and the top plate 22. In a virtual clearance between the bottom plate 21 and the top plate 22, one wall 27b is provided. The wall 27b is integrally formed with the bottom plate 21 and the top plate 22.

The outer wall 27b is curved so that a substantial center of the outer wall 23 in the vertical direction protrudes toward the outside of the shock absorbing member 10 from the centers of the bottom plate 21 and the top plate 22. Specifically, the support member 20 illustrated in the left of FIG. 13 is provided so that the substantial center of the wall 27b in the vertical direction is provided to protrude toward the left of FIG. 13. Whereas, the support member 20 illustrated in the right of FIG. 13 is provided so that the substantial center of the wall 27b in the vertical direction is provided to protrude toward the right of FIG. 13.

Each of the support members 20 includes one tube 28b. The tube 28b extends in a direction in which the walls 27b face each other (in the right-left direction of FIG. 13). The tube 28b is integrally formed with the wall 27b at the substantial center of the outer wall 27b in the vertical direction. Inside the tube 28a, a through hole 29b whose cross section is substantially circular is formed in the longitudinal direction of the tube 28b. (See FIG. 14.)

The connection member 40 is laid across the support members 20, and connects the support members 20 together. The connection member 40 in this embodiment is different from that in the first embodiment; that is, the connection member 40 in this embodiment is formed in a non-closed shape between the tubes 28b. Specifically, the connection member 40 linearly extends between the tubes 28b while each of the ends of the connection member 40 is inserted through a corresponding one of the through holes 29b of the tubes 28b.

Both ends of the connection member 40 are provided with the retainers 50. Each of the retainers 50 is provided outward of the tubes 28b. Each of the retainers 50 is formed in a substantial sphere having an outer diameter larger than an inner diameter of the through hole 29b for each of the tubes 28b. Note that the shapes of the retainers 50 are not limited to such shapes. Alternatively, the retainers 50 may be formed in various shapes.

As described above, in the shock absorbing member 10 according to the fourth embodiment, the retainers 50 provided to both ends of the connection member 40 reduce the risk of the connection member 40 in a non-closed shape coming off the tubes 28b. Hence, even though the walls 27b of the support members 20 elastically deform by the external force F in the vertical direction, the connection member 40 does not easily come off the tubes 28b, and the connection member 40 can be stably held by the support members 20 regardless of the degree of the deformation caused by the elastic deformation. Therefore, the shock absorbing member 10 according to the fourth embodiment of the present disclosure can maintain shock absorbing properties and repulsive force regardless of the degree of the external force F.

Moreover, in the shock absorbing member 10 according to the fourth embodiment, the walls 27b deform in parallel with a longitudinal direction of the connection member 40. Such a feature can intensively increase shock absorbing properties and repulsive force in a predetermined direction.

Figure 12:
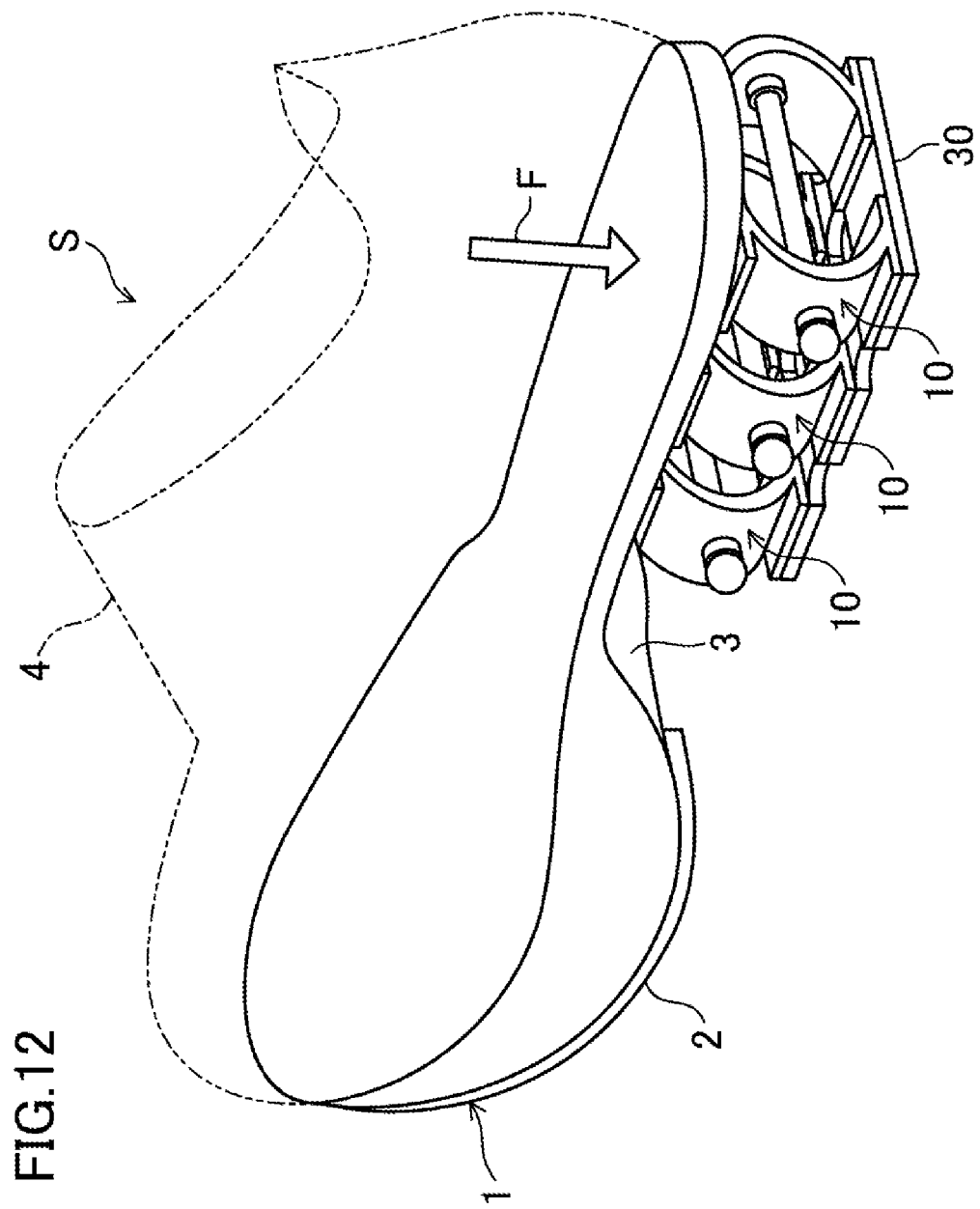
FIG. 12 is a perspective view of a shoe according to a fourth embodiment of the present disclosure.

In the fourth embodiment, as illustrated in FIG. 12, multiple shock absorbing members 10 (three in the exemplary drawing) are arranged to correspond to the heel of the sole 1 and spaced apart from each other in the fore-aft direction. Then, the shock absorbing members 10 are arranged so that the connection members 40 extend along the foot width. Thanks to such features, the shoe S including the shock absorbing members 10 according to the fourth embodiment makes it possible to appropriately reduce shock, caused when the sole 1 touches the ground, in a position corresponding to the heel of the foot, and to stably maintain a sense of foot balance to keep the wearer from feeling an uneven sense of foot balance along the foot width.

Variation of Forth Embodiment

Figure 16:
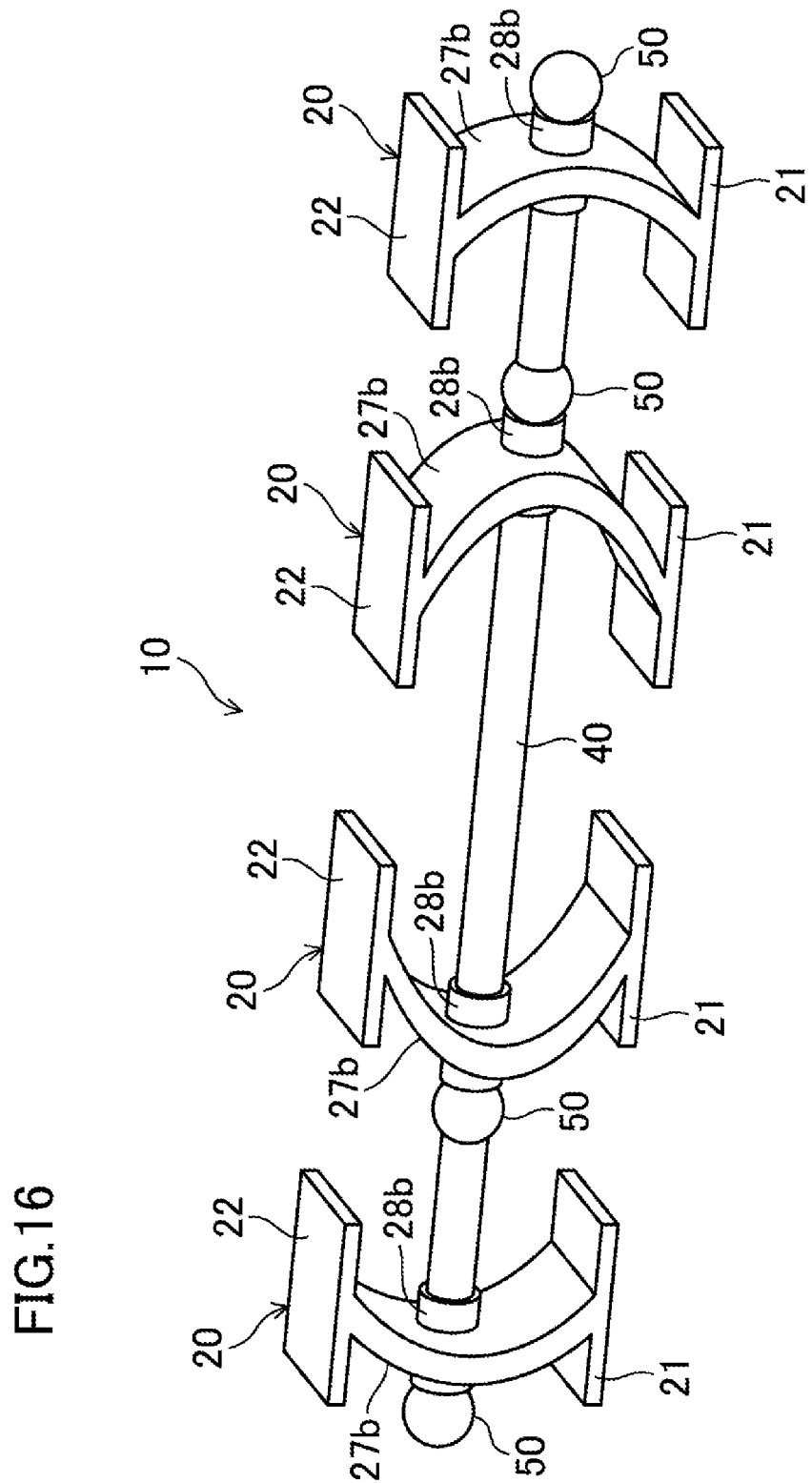
FIG. 16 is a perspective view illustrating a modification of the shock absorbing member according to the fourth embodiment, as viewed from above.
Figure 17:
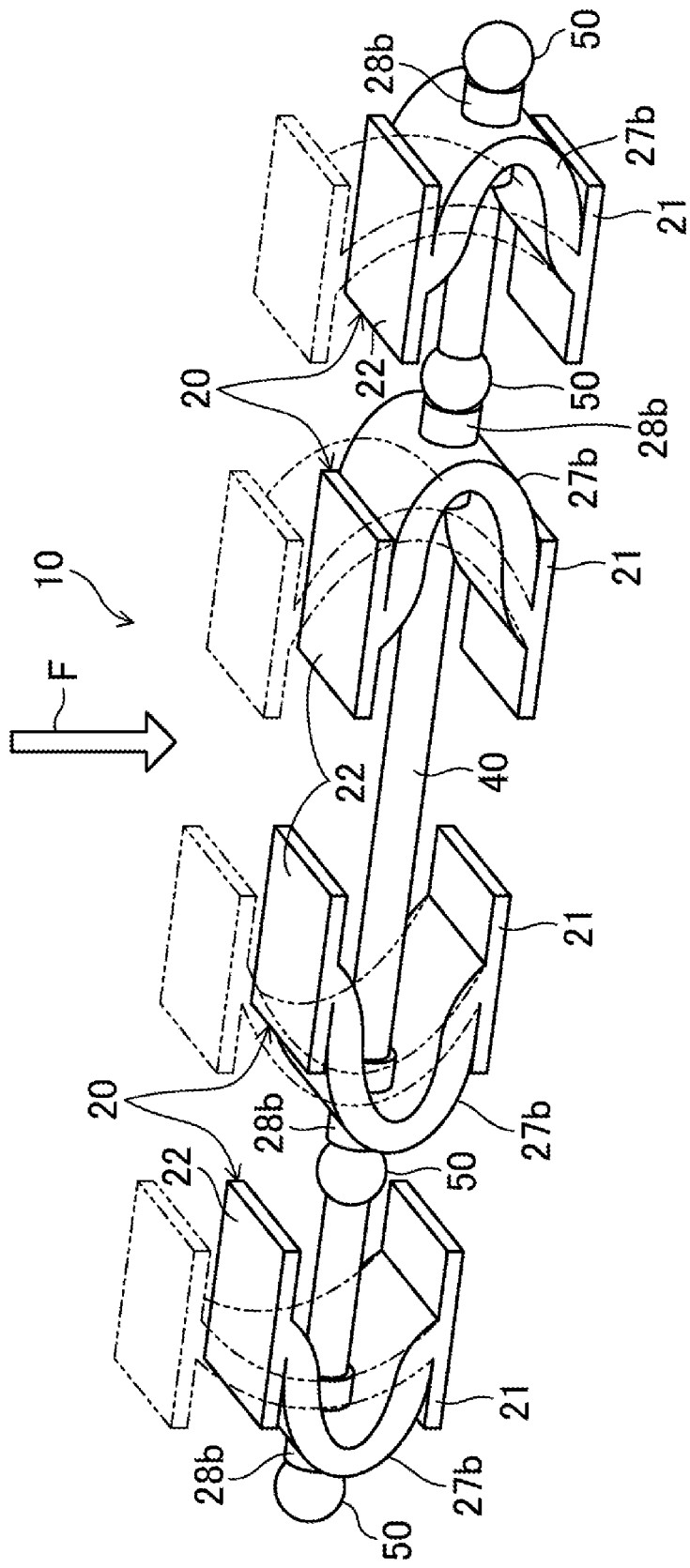
FIG. 17 is a perspective view illustrating how support members and a connection member deform when external force in a vertical direction is applied to the modification of the shock absorbing member according to the fourth embodiment.

FIGS. 16 and 17 illustrate a variation of the shock absorbing member 10 according to the above fourth embodiment. As illustrated in FIGS. 16 and 17, the shock absorbing member 10 according to this variation additionally includes two other support members 20, compared with the shock absorbing member 10 in the fourth embodiment.

Specifically, two of the support members 20 (i.e., support members 20 illustrated in the left of FIG. 16) are provided so that the substantial centers of the walls 27b in the vertical direction are provided to protrude toward the left of FIG. 16. Whereas, the other two of the support members 20 (i.e., support members 20 illustrated in the right of FIG. 16) are provided so that the substantial centers of the walls 27b in the vertical direction are provided to protrude toward the right of FIG. 16.

The connection member 40 includes multiple retainers 50. The retainers 50 are provided outward of the tubes 28b. The retainers 50 reduce the risk of the connection member 40 in a non-closed shape coming off the tubes 28b.

As illustrated in FIG. 17, the two of the support members 20 are bent to deform toward the left in FIG. 17 along the longitudinal direction of the connection member 40 when the walls 27b receive the external force F in the vertical direction. Whereas, the other two of the support members 20 are bent to deform toward the right in FIG. 17 along the longitudinal direction of the connection member 40 when the walls 27b receive the external force F in the vertical direction. Then, when receiving the external force F in the vertical direction, the connection member 40 is pulled in the right-left direction by the walls 27b of the support members 20 provided to the left and right from the center of the connection member 40. As a result, the connection member 40 extends in the right-left direction. Thanks to the arrangement of the support members 20, the shock absorbing member 10 according to this variation can further improve shock absorbing properties and repulsive force in a predetermined direction.

Fifth Embodiment

Figure 18:
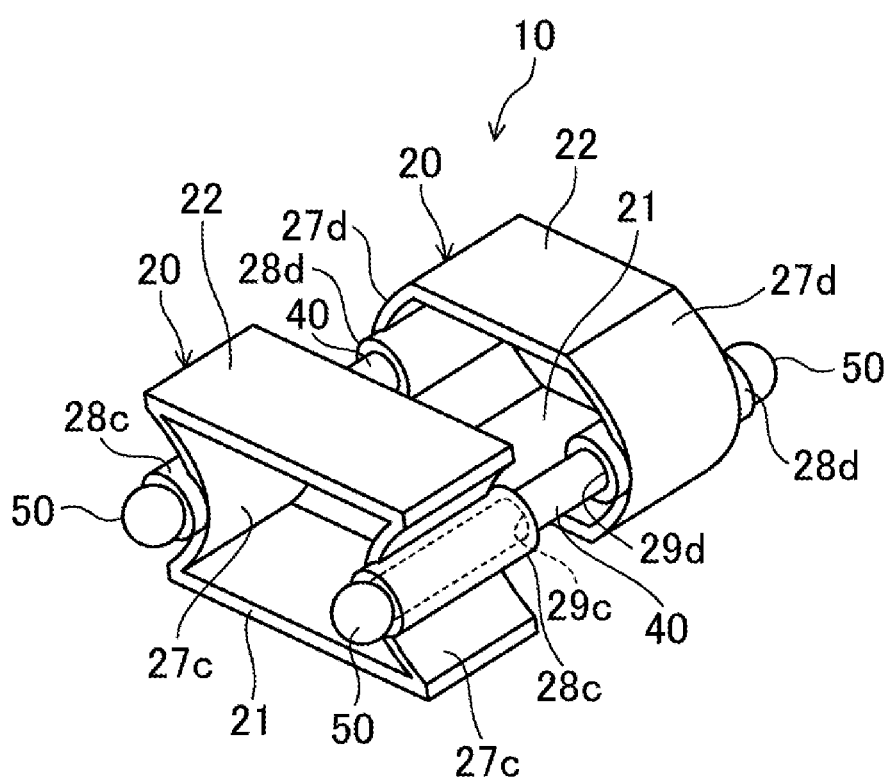
FIG. 18 is a perspective view illustrating a shock absorbing member according to a fifth embodiment, as viewed from above.
Figure 19:
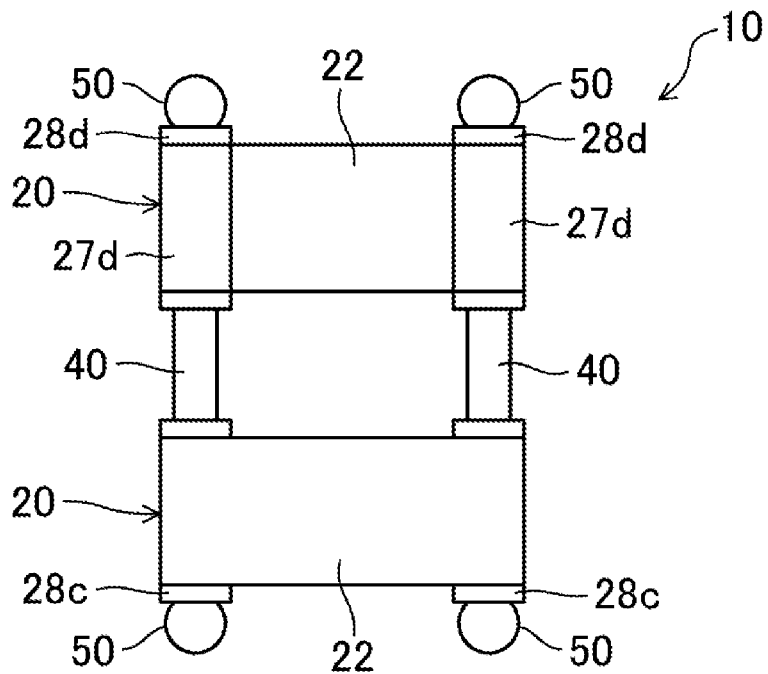
FIG. 19 is a plan view illustrating the shock absorbing member according to the fifth embodiment.
Figure 20:
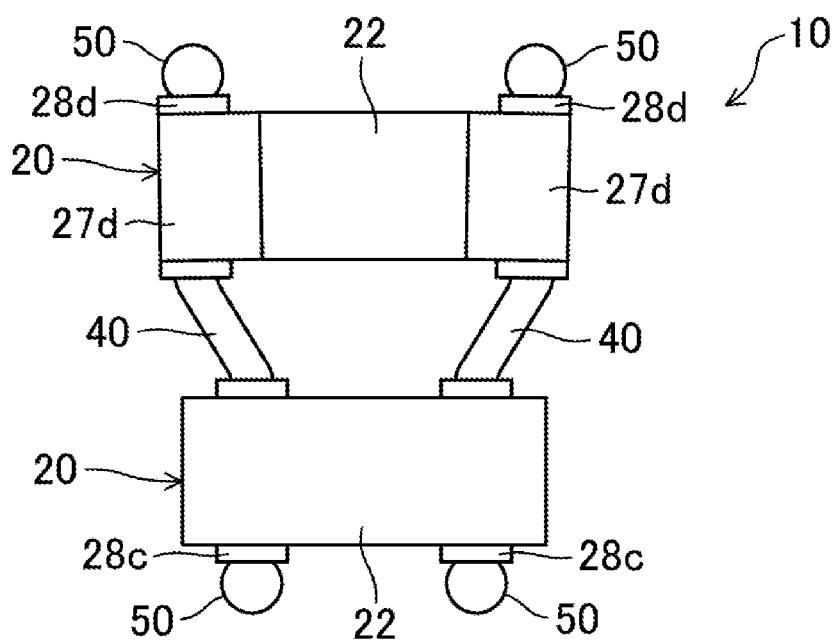
FIG. 20 is a plan view illustrating how support members and connection members deform when external force in a vertical direction is applied to the shock absorbing member according to the fifth embodiment.

FIGS. 18 to 20 illustrate the shock absorbing member 10 according to a fifth embodiment of the present disclosure. The fifth embodiment is different in configurations of the support members 20 and the connection members 40 from the fourth embodiment. In particular, the difference between the fifth embodiment and the fourth embodiment is the direction in which the connection members 40 deform when the connection members 40 receive external force. Note that other configurations of the shock absorbing member 10 according to this embodiment are the same as those of the shock absorbing member 10 of the fourth embodiment. Therefore, elements that are the same as those shown in FIGS. 12 to 15 are denoted by the corresponding reference characters, and a detailed description thereof is omitted herein.

As illustrated in FIGS. 18 to 20, the shock absorbing member 10 according to the fifth embodiment includes two support members 20. As seen in the fourth embodiment, each of the support members 20 includes the bottom plate 21 and the top plate 22.

As illustrated in FIG. 18, in a vertical clearance between the bottom plate 21 and the top plate 22 of each support member 20 (the support member 20 closer to the viewer in FIG. 18), the outer walls 27c are provided. The walls 27c are provided to the short sides of the bottom plate 21 and the top plate 22. Moreover, the walls 27c face each other in the right-left direction of FIG. 18. The walls 27c are integrally formed with the bottom plate 21 and the top plate 22 to the short sides of the bottom plate 21 and the top plate 22. Each of the walls 27c is curved so that a substantial center of the wall 27c in the vertical direction is recessed from ends of the short sides of the bottom plate 21 and the top plate 22 toward the center of the bottom plate 21 and the top plate 22 in the right-left direction.

One of the support members 20 includes a pair of tubes 28c. The tubes 28c extend in parallel with each other in a direction parallel with the short sides of the bottom plate 21 and the top plate 22. Each of the tubes 28c is positioned in the vertically substantial center of an inner side face of the wall 27c. Each tube 28a is integrally formed with a corresponding one of the walls 27c. Inside the tube 28c, a through hole 29c whose cross section is substantially circular is formed in parallel with the short sides of the bottom plate 21 and the top plate 22 (see FIG. 18).

In a vertical clearance between the bottom plate 21 and the top plate 22 of the other support member 20 (the support member 20 away from the viewer in FIG. 18), walls 27d are provided. The walls 27d are provided to the short sides of the bottom plate 21 and the top plate 22. Moreover, the walls 27d face each other in the right-left direction of FIG. 18. The walls 27d are integrally formed with the bottom plate 21 and the top plate 22 to the short sides of the bottom plate 21 and the top plate 22. Each of the walls 27d is curved so that a substantial center of the wall 27d in the vertical direction protrudes outward in the right-left direction from ends of the short sides of the bottom plate 21 and the top plate 22.

The other one of the support members 20 includes a pair of tubes 28d. The tubes 28d extend in parallel with each other along the short sides of the bottom plate 21 and the top plate 22. Each of the tubes 28d is positioned in the vertically substantial center of an outer side face of the wall 27d. Each tube 28d is integrally formed with a corresponding one of the walls 27d. Inside the tube 28d, a through hole 29d whose cross section is substantially circular is formed in parallel with the short sides of the bottom plate 21 and the top plate 22 (see FIG. 18).

The shock absorbing member 10 according to the fifth embodiment includes two connection members 40. Each of the connection members 40 is laid across the support members 20, and connects the support members 20 to each other. The connection member 40 is formed in a non-closed shape between the tubes 28c and 28b. Specifically, each of the connection members 40 linearly extends between the tubes 28c and 28d while inserted through the through hole 29c of the tube 28c and the through hole 29d of the tube 28d.

Both ends of the connection members 40 are provided with the retainers 50. Each of the retainers 50 formed close to the viewer of FIG. 18 is provided outward of the tubes 28c. Each of the retainers 50 formed away from the viewer of FIG. 18 is provided outward of the tubes 28d. Each of the retainers 50 is formed in a substantial sphere having an outer diameter larger than inner diameters of the through holes 29c and 29d for the tubes 28c and 28d. Note that the shapes of the retainers 50 are not limited to such shapes. Alternatively, the retainers 50 may be formed in various shapes.

Then, as illustrated in FIGS. 19 and 20, when the walls 27c receive the external force in the vertical direction, the one of the support members 20 is bent to deform inward in the right-left direction in FIGS. 19 and 20 intersecting with a direction in which the tubes 28c extend. In contrast, when the walls 27d receive the external force in the vertical direction, the other one of the support members 20 is bent to deform outward in the right-left direction in FIGS. 19 and 20 intersecting with a direction in which the tubes 28d extend. Specifically, when receiving the external force in the vertical direction, intermediate portions of the connection members 40 sheer-deform by the walls 27c and 27d of the support members 20 in a direction intersecting with a direction in which the tubes 28c and 28d extend.

As described above, in the shock absorbing member 10 according to the fifth embodiment, the retainers 50 provided to both ends of the connection members 40 reduce the risk of the connection members 40 in a non-closed shape coming off the tubes 28c and 28d. Hence, as illustrated in FIG. 20, even though the walls 27c and 27d elastically deform by the external force in the vertical direction, the connection members 40 do not easily come off the tubes 28c and 28d, and the connection members 40 can be stably held by the support members 20 regardless of the degree of the deformation caused by the elastic deformation. Therefore, as seen in the fourth embodiment, the shock absorbing member 10 according to the fifth embodiment of the present disclosure can maintain shock absorbing properties and repulsive force regardless of the degree of the external force in the vertical direction.

Sixth Embodiment

Figure 21:
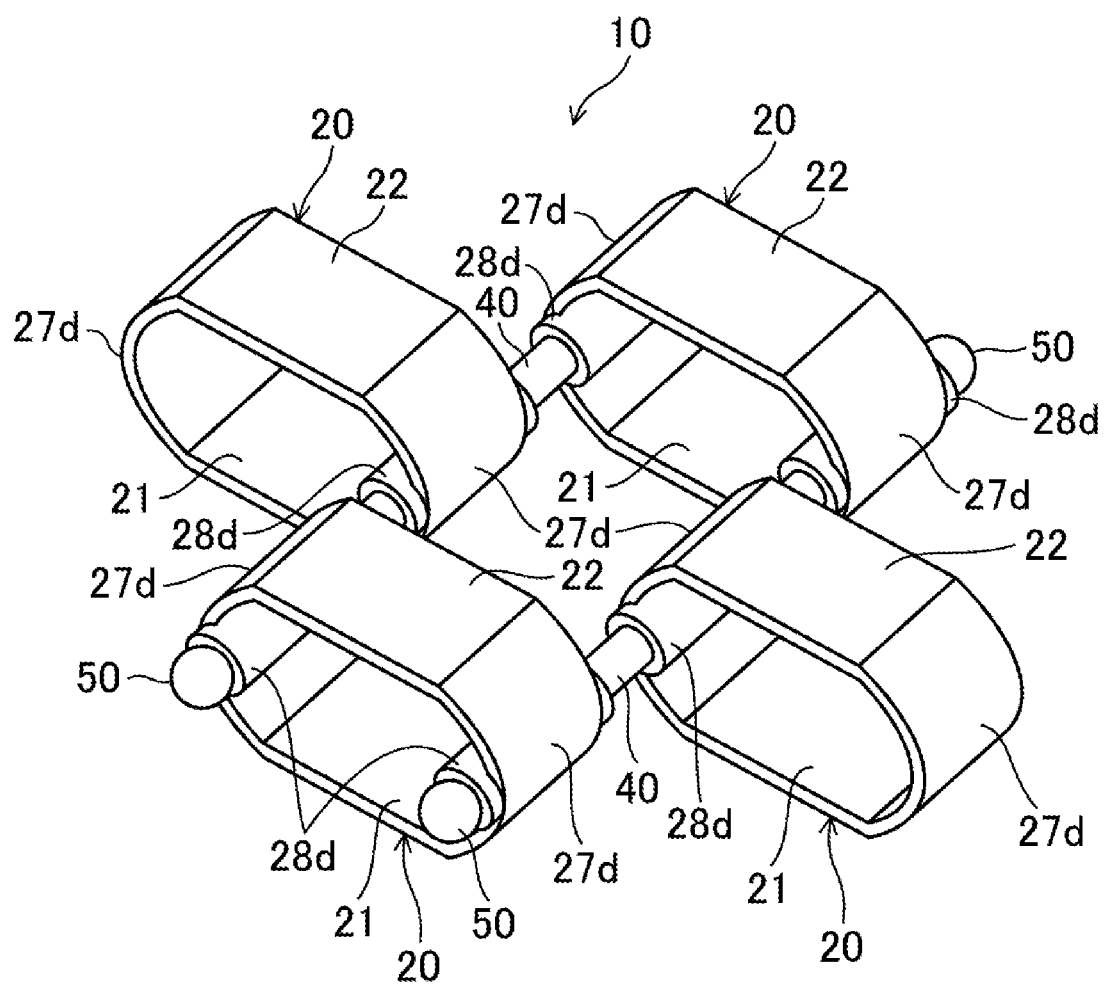
FIG. 21 is a perspective view illustrating a shock absorbing member according to a sixth embodiment, as viewed from above.
Figure 22:
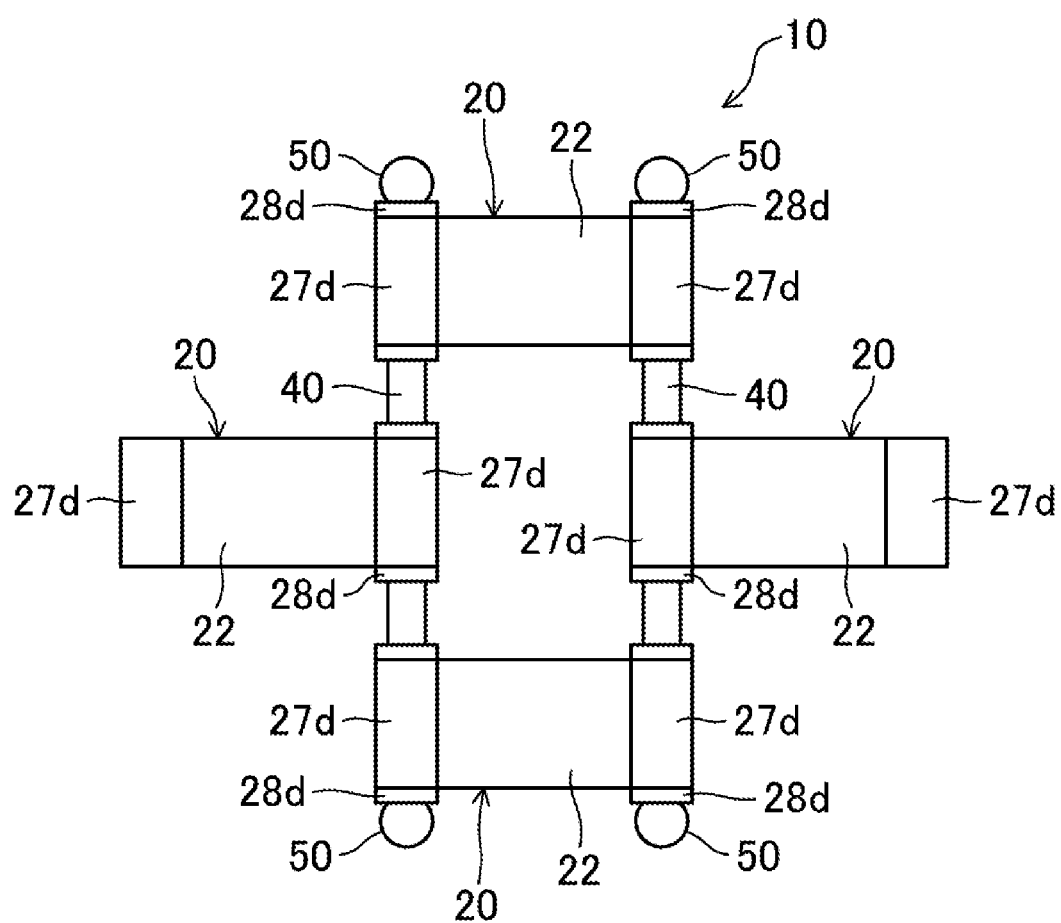
FIG. 22 is a plan view illustrating the shock absorbing member according to the sixth embodiment.
Figure 23:
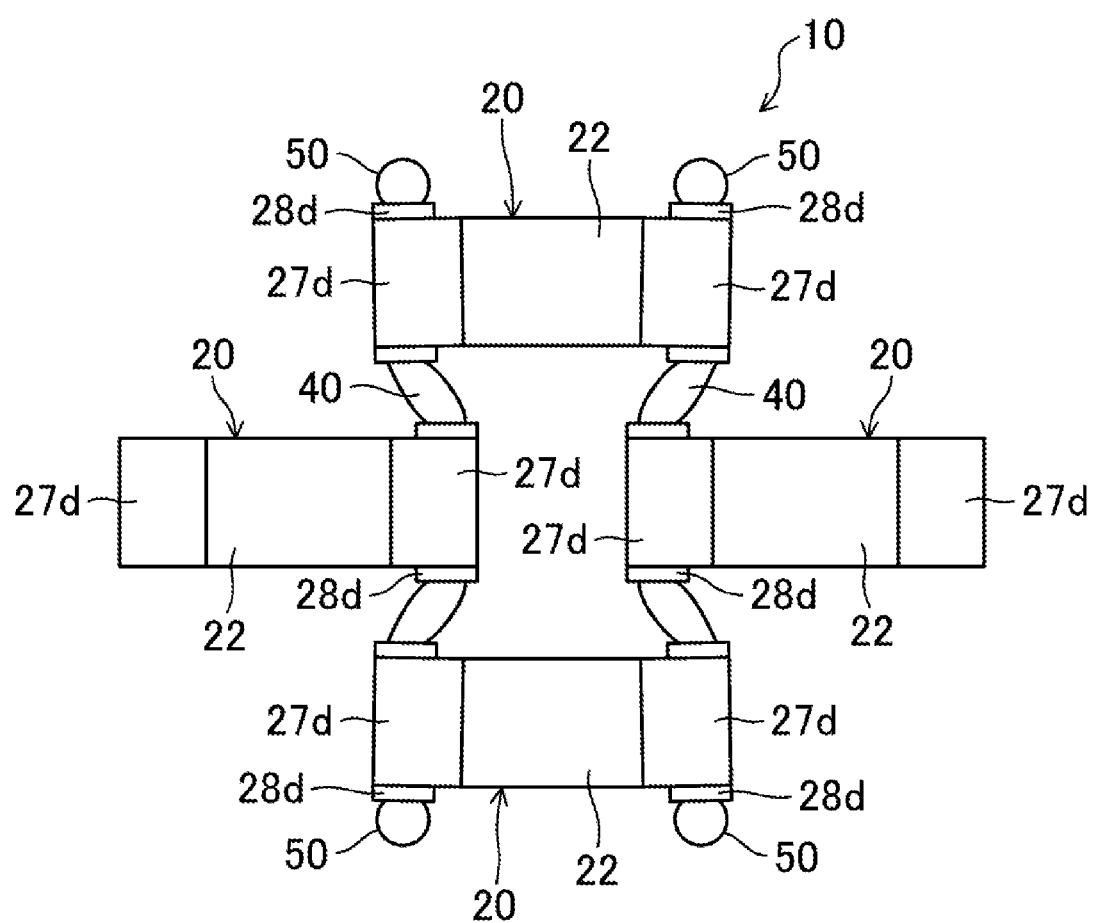
FIG. 23 is a plan view illustrating how support members and connection members deform when external force in a vertical direction is applied to the shock absorbing member according to the sixth embodiment.

FIGS. 21 to 23 illustrate the shock absorbing member 10 according to the sixth embodiment of the present disclosure. The sixth embodiment is different in some configurations of the support members 20 from the fifth embodiment. Note that other configurations of the shock absorbing member 10 according to this embodiment are the same as those of the shock absorbing member 10 of the fifth embodiment. Therefore, elements that are the same as those shown in FIGS. 18 to 20 are denoted by the corresponding reference characters, and a detailed description thereof is omitted herein.

As illustrated in FIG. 21, in the shock absorbing member 10 according to the sixth embodiment, the support members 20 do not have the walls 27c and the tubes 28c described in the fifth embodiment. Specifically, in the shock absorbing member 10 according to the sixth embodiment, the support members 20 have the walls 27d and the tubes 28d alone described in the fifth embodiment.

Specifically, both ends of the connection members 40 are provided with the respective support members 20 having the walls 27d and tubes 28d described in the fifth embodiment. Moreover, to the intermediate portion of each of the connection members 40, the support member 20 is connected. This support member 20 has the tubes 28d integrally formed with the walls 27d on either side. Specifically, the connection members 40 linearly extend between the tubes 28d while inserted in the through holes 29d of the tubes 28d.

As illustrated in FIGS. 22 and 23, when the walls 27d receive the external force in the vertical direction, the support members 20 each connected to the respective ends of the connection members 40 are bent to deform outward in the right-left direction intersecting with the direction in which the tubes 28d extend. Hence, both ends of each connection member 40 deform so that the ends separate from each other in the right-left direction.

In contrast, in the support members 20 connected to the intermediate portions of the connection members 40, the walls 27d are bent to deform outward in the right-left direction when receiving the external force in the vertical direction. Hence, the intermediate portions of the connection members 40 deform to move close to each other in the right-left direction.

As can be seen, the both ends and intermediate portions of the connection members 40 deform in a different direction when receiving the external force in the vertical direction. Hence, the connection members 40 sheer-deform in a direction intersecting with a direction in which the tubes 28d extend (in the right-left direction in FIG. 23). Therefore, as seen in the fifth embodiment, the shock absorbing member 10 according to the sixth embodiment can maintain shock absorbing properties and repulsive force regardless of the degree of the external force in the vertical direction.

Variation of Sixth Embodiment

Figure 24:
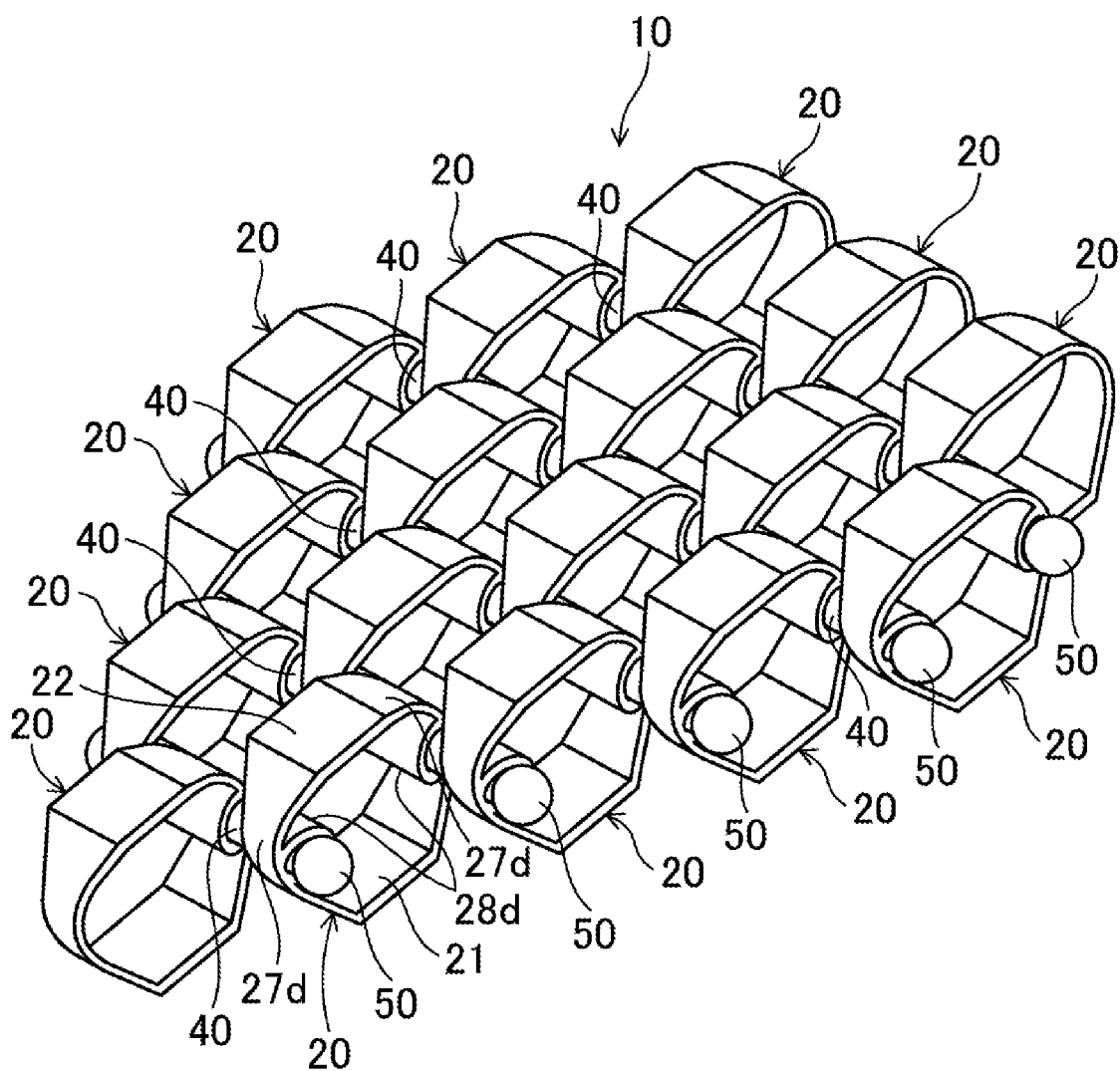
FIG. 24 is a perspective view illustrating a modification of the shock absorbing member according to the sixth embodiment, as viewed from above.
Figure 25:
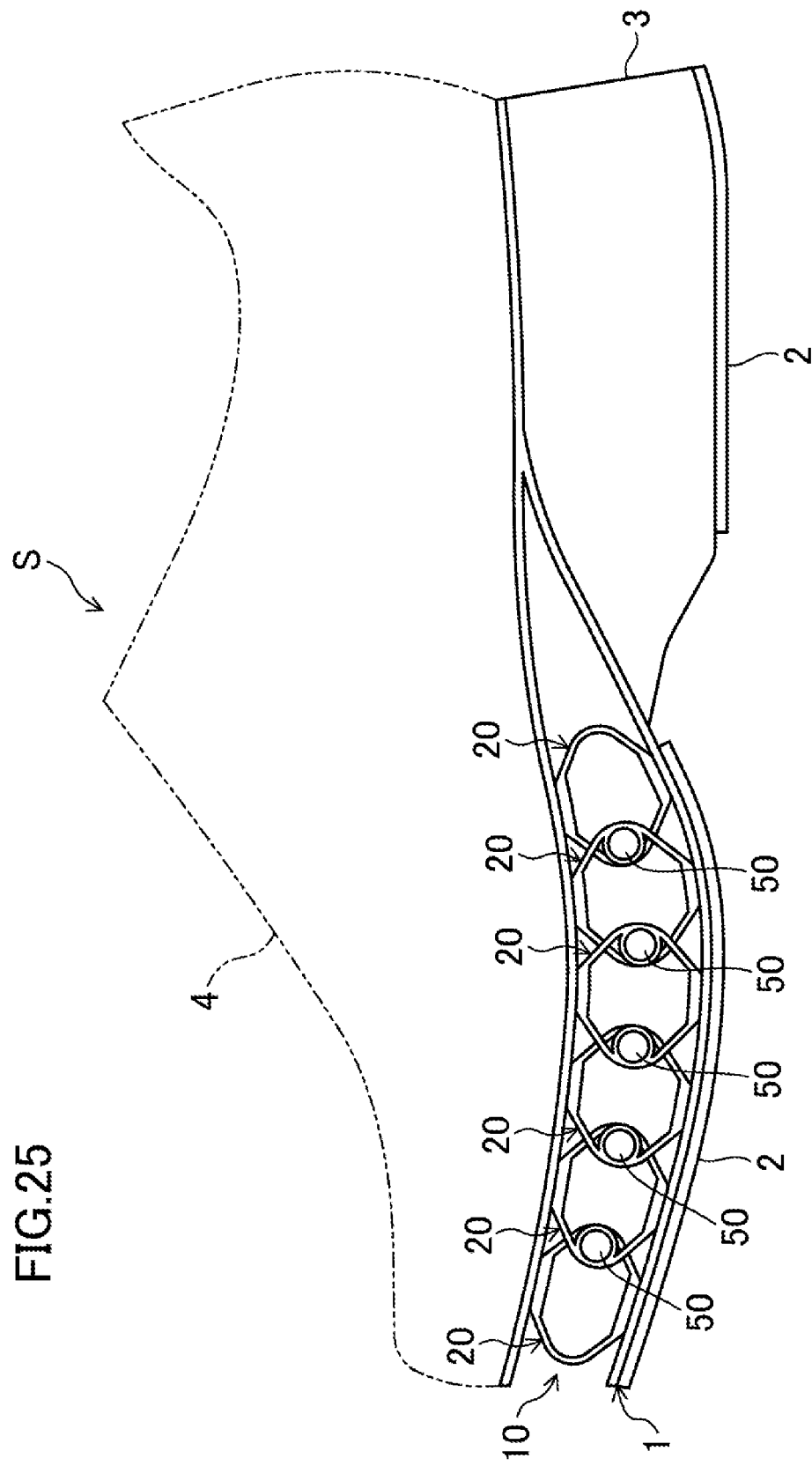
FIG. 25 is a side view illustrating a shoe including a modification of the shock absorbing member according to the sixth embodiment.
Figure 26:
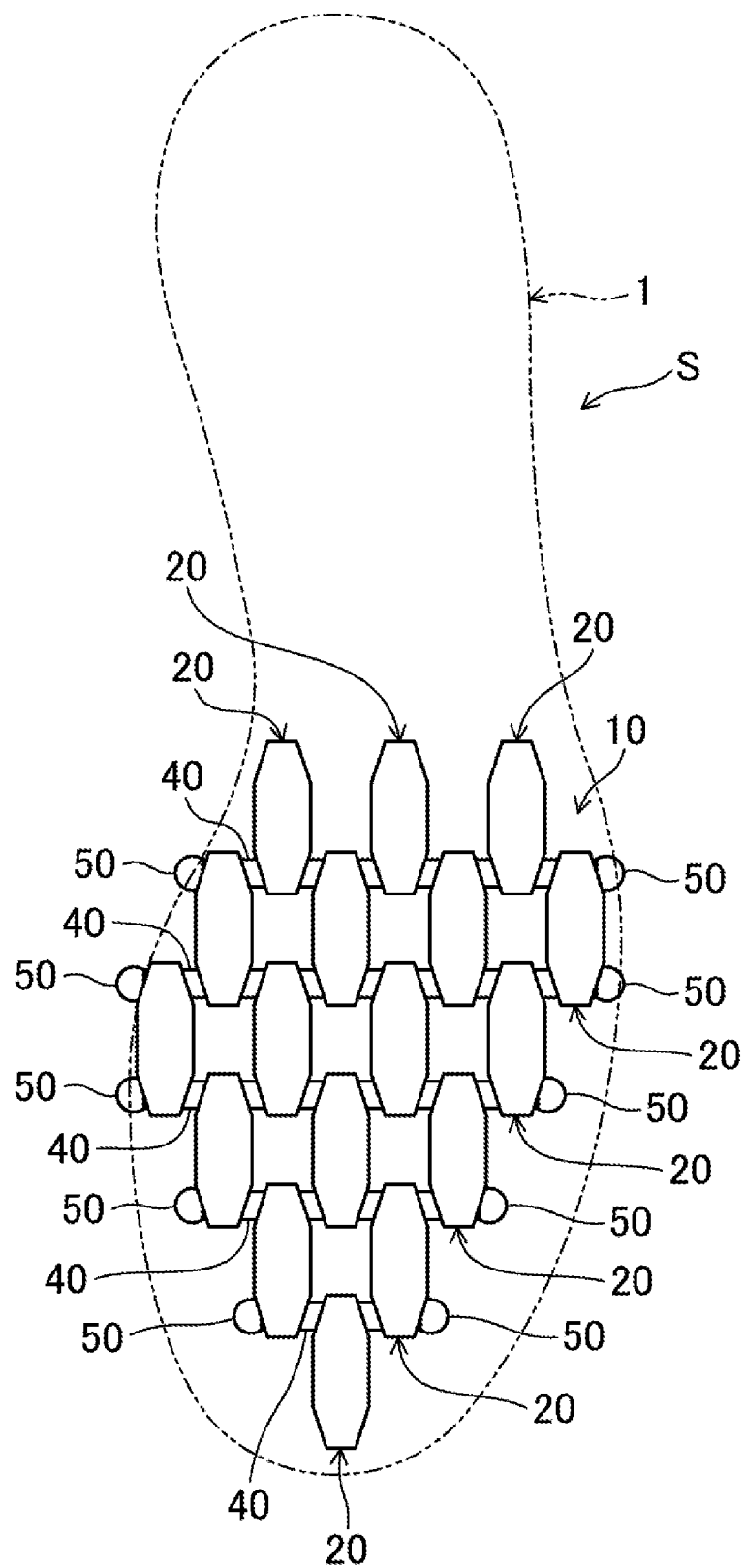
FIG. 26 is a plan view illustrating a shoe including the modification of the shock absorbing member according to the sixth embodiment.

FIGS. 24 to 26 illustrate a variation of the shock absorbing member 10 according to the above sixth embodiment. As illustrated in FIGS. 24 to 26, in the shock absorbing member 10 according to this variation, the support members 20 and the connection members 40 described in the sixth embodiment are provided to a forefoot region, of the sole 1 of the shoe S, including a position of the MP joints of the wearer's foot. Therefore, the forefoot 10 can exert greater shock absorbing properties and repulsive force in the forefoot region.

Moreover, in the shock absorbing member 10 according to this variation, the support members 20 are assembled to be arranged in the fore-aft direction and the foot width direction via the connection members 40. Then, the connection members 40 are arranged so that the longitudinal direction of the connection members 40 follows in the foot width direction of the shoe S. Such features allow the support members 20 to vertically rotate about the connection members 40, extending in the foot width direction, as rotation axes. Such features allow the shock absorbing member 10, positioned in the forefoot region of the shoe S, to follow the motion of the MP joints when the wearer is, for example, walking or running.

Seventh Embodiment

FIGS. 27 to 30 illustrate the shock absorbing member 10 according to the seventh embodiment of the present disclosure. The seventh embodiment is different in configurations of the support members 20 and the connection member 40 from the fourth embodiment. In particular, the seventh embodiment is different in shapes of the tubes and the connection member 40 provided to the support members 20 from the fourth embodiment. Note that other configurations of the shock absorbing member 10 according to this embodiment are the same as those of the shock absorbing member 10 of the fourth embodiment. Therefore, elements that are the same as those shown in FIGS. 12 to 15 are denoted by the corresponding reference characters, and a detailed description thereof is omitted herein.

Figure 27:
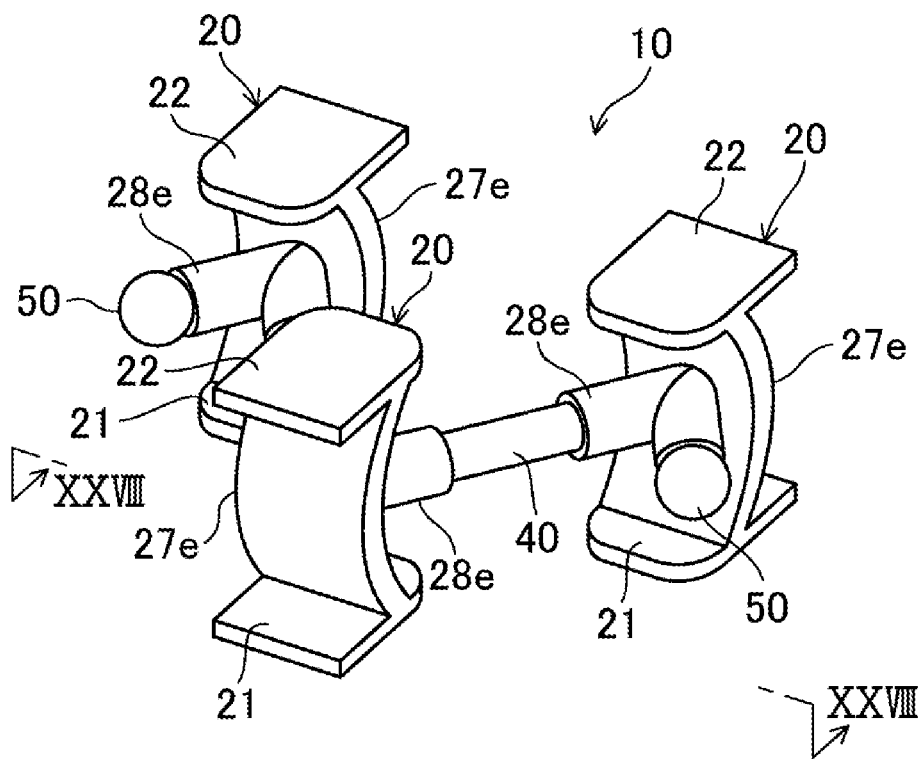
FIG. 27 is a perspective view illustrating a shock absorbing member according to a seventh embodiment, as viewed from above.

As illustrated in FIG. 27, the shock absorbing member 10 according to the seventh embodiment includes three support members 20. As seen in the fourth embodiment, each of the support members 20 includes the bottom plate 21 and the top plate 22. In a virtual clearance between the bottom plate 21 and the top plate 22 of each of the support members 20, one wall 27e is provided. The wall 27e is integrally formed with the bottom plate 21 and the top plate 22.

As illustrated in FIG. 27, the wall 27e of one of the support members 20 (the support member 20 illustrated closer to the viewer in FIG. 27) is curved so that a substantial center of the wall 27e in the vertical direction protrudes in the FIG. 27 toward the viewer from the centers of the bottom plate 21 and the top plate 22. Moreover, the walls 27e of the other support members 20 (the support members 20 illustrated away from the viewer in FIG. 27) are curved so that substantial centers of the walls 27e in the vertical direction protrude in the FIG. 27 away from the viewer from the centers of the bottom plate 21 and the top plate 22.

Figure 28:
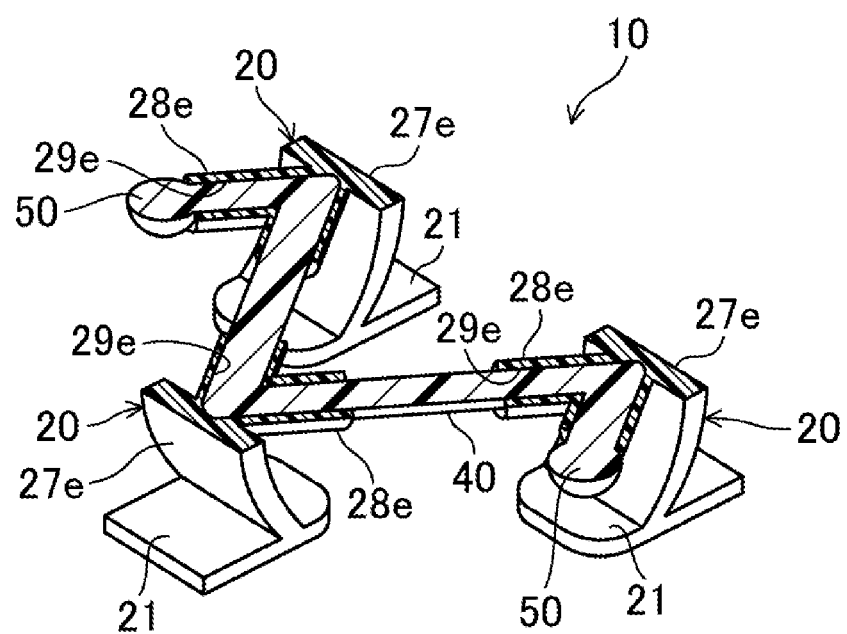
FIG. 28 is a perspective view illustrating a cross section taken along line XXVIII-XXVIII in FIG. 27.

Each of the support members 20 includes one tube 28e. The tube 28e is positioned in the vertically substantial center of an inner side face of the wall 27e. The tube 28e branches off, at a crimp formed in the middle of the tube 28e, in a different direction toward each end of the tube 28e. Moreover, the tube 28e is formed in a substantial V-shape in plan view. The crimp of the tube 28e is integrally formed with the wall 27e while making contact with the vertically substantial center of the inner side face of the wall 27e. As illustrated in FIG. 28, inside the tube 28e, a through hole 29e whose cross section is substantially circular is formed in the longitudinal direction of the tube 28e.

The shock absorbing member 10 according to the seventh embodiment includes one connection member 40. The connection member 40 is laid across the support members 20, and connects the support members 20 together. The connection member 40 is formed in a non-closed shape between the tubes 28e. Moreover, the connection member 40 is bent and provided between the tubes 28e while inserted in a through hole 29e of the tube 28e of each support member 20.

Both ends of the connection member 40 are provided with retainers 50. Each of the retainers 50 formed away from the viewer of FIG. 27 is provided outward of the tubes 28e. Each of the retainers 50 is formed in a substantial sphere having an outer diameter larger than an inner diameter of the through hole 29e for the tube 28e. Note that the shapes of the retainers 50 are not limited to such shapes. Alternatively, the retainers 50 may be formed in various shapes.

Figure 29:
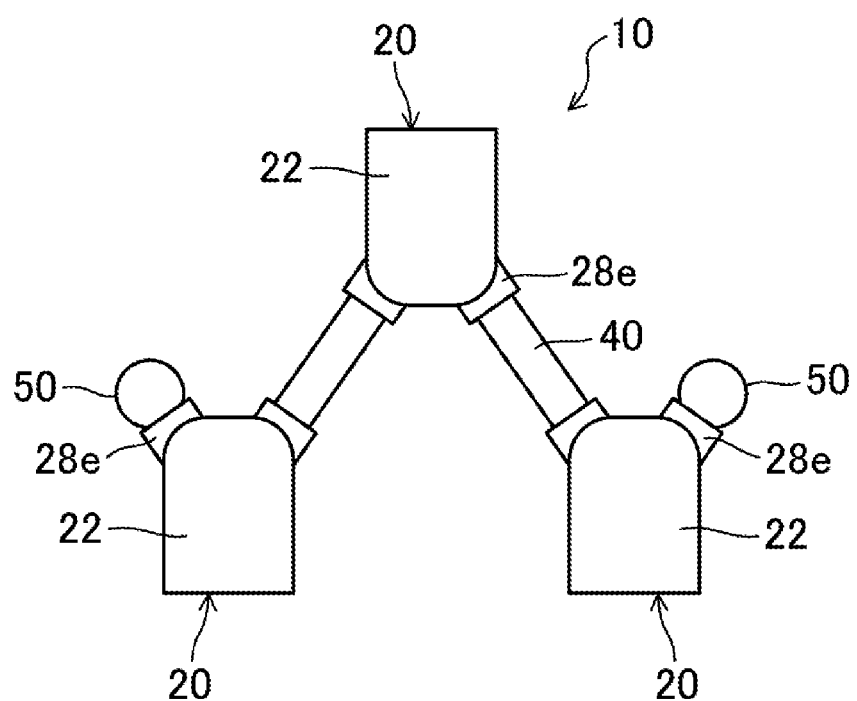
FIG. 29 is a plan view illustrating the shock absorbing member according to the seventh embodiment.
Figure 30:
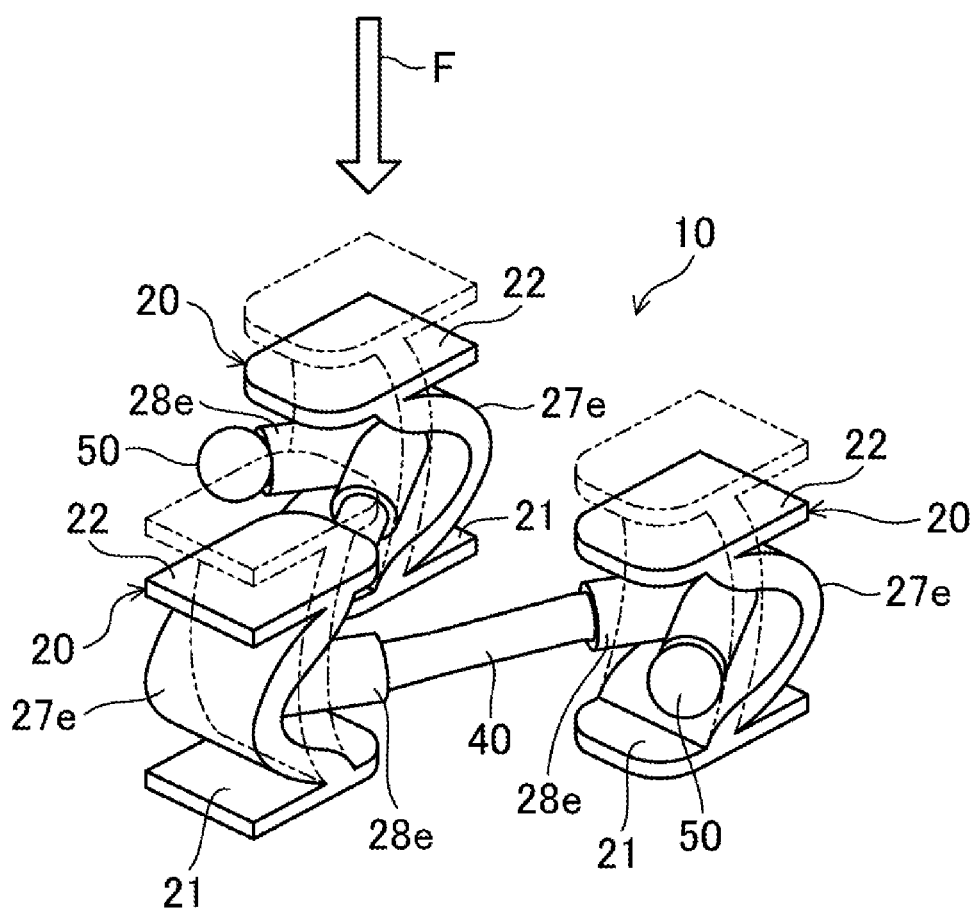
FIG. 30 is a perspective view illustrating how support members and a connection member deform when external force in a vertical direction is applied to the shock absorbing member according to the seventh embodiment.

As illustrated in FIGS. 29 and 30, in one of the support members 20, the vertically substantial center of the wall 27e is bent to deform and protrudes toward the viewer of FIG. 30 when the support member 20 receives the external force F in the vertical direction (see FIG. 30). The vertically substantial center of the wall 27e of each of the other support members 20 is bent to deform and protrude away from the viewer of FIG. 30.

When receiving the external force F, the connection member 40 stretches to deform by the walls 27e of the support members 20 in the longitudinal direction of the support member 40. Specifically, the connection member 40 stretches between the tube 28e of the one support member 20 and the tubes 28e of the other support members 20. Therefore, as seen in the fourth embodiment, the shock absorbing member 10 according to the seventh embodiment can maintain shock absorbing properties and repulsive force regardless of the degree of the external force in the vertical direction.

Eighth Embodiment

Figure 31:
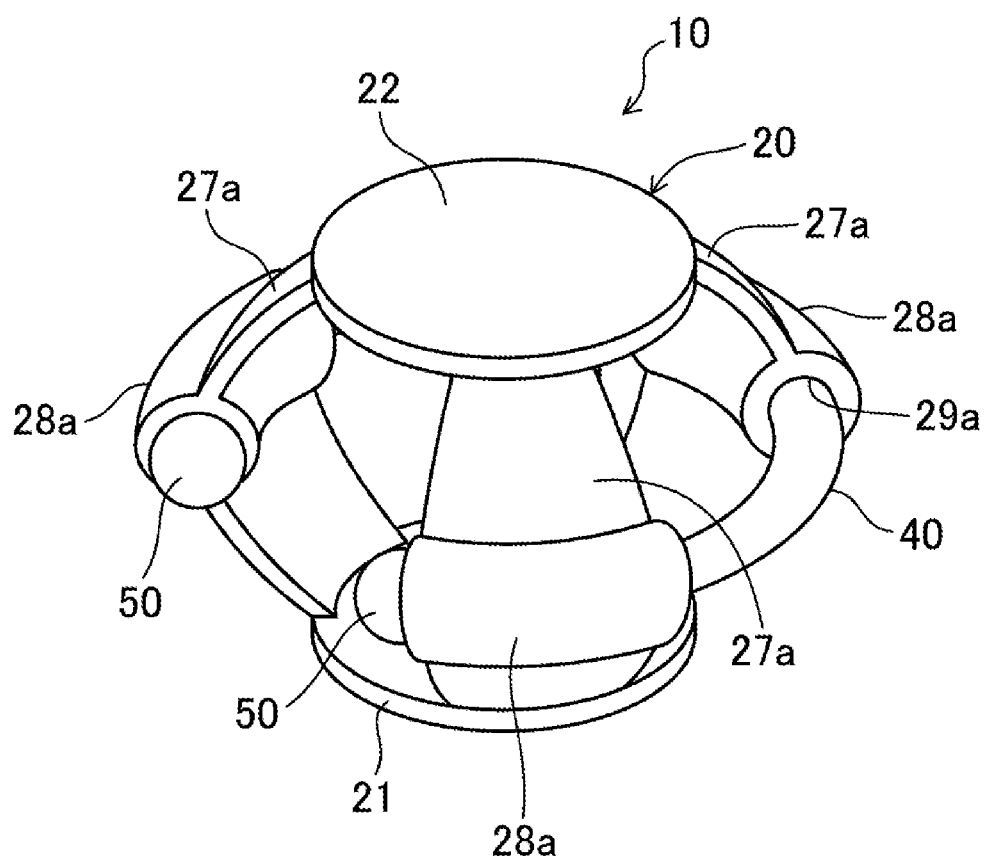
FIG. 31 is a perspective view illustrating a shock absorbing member according to an eighth embodiment, as viewed from above.

FIG. 31 illustrates the shock absorbing member 10 according to the eighth embodiment of the present disclosure. The eighth embodiment is different in specific configurations of the connection member 40 from the second embodiment. Specifically, the retainers 50 described in the third embodiment are provided to the respective ends of the connection member 40. Therefore, the shock absorbing member 10 according to the eighth embodiment can achieve the same advantages as seen in the shock absorbing member 10 described in the third embodiment.

Other Embodiments

As the shoe S according to the second to eighth embodiments, the shock absorbing member 10 may be provided to a position, in the sole 1, corresponding to one of at least the heel or the MP joints of the wearer's foot.

Note that the present disclosure is not limited to the embodiment described above, and various changes and modifications may be made without departing from the scope of the present disclosure.

The present disclosure is industrially applicable to, for example, athletic shoes for various sports, sneakers for daily use, and rehabilitation shoes.

What is claimed is:

1. A shock absorbing member for a sole of a shoe, the shock absorbing member comprising:
   support members spaced apart from each other; and
   a connection member laid across, and connecting together, the support members, wherein
   each of the support members includes:
   a wall capable of elastically deforming by external force in a vertical direction; and
   at least one tube provided to the wall, and
   while inserted through the tube of the support member, the connection member is integrally formed in a closed shape with ends of the connection member having no seams.

2. The shock absorbing member of claim 1, wherein
   an elastic range of a material of the connection member is larger than an elastic range of a material of the support member.

3. A shoe including the shock absorbing member according to claim 2, the shock absorbing member being provided in a position corresponding to one of at least a heel or MP joints of a foot of a wearer.

4. The shock absorbing member of claim 1, wherein
   the shock absorbing member has an outer periphery portion formed to be substantially annular in plan view, the connection member includes:
   first connections extending, along a circumference of the outer periphery portion, between the support members neighboring; and
   second connections extending inward from the circumference of the outer periphery portion, and
   when the support members elastically deform, receiving the external force, each of the first and second connections is pulled in a longitudinal direction of the first and second connections.

5. A shoe including the shock absorbing member according to claim 4, the shock absorbing member being provided in a position corresponding to one of at least a heel or MP joints of a foot of a wearer.

6. The shock absorbing member of claim 4, wherein
   each of the at least one tube includes:
   a first tube extending along the circumference of the outer periphery portion; and
   a second tube extending inward from the circumference of the outer periphery portion and communicating with the first tube,
   each of the first connections is provided to the support members while opposing side-ends of the first connection are inserted through the first tube, and
   each of the second connections is provided to a corresponding one of the support members while an outer end positioned close to the outer periphery portion is inserted through the second tube.

7. A shoe including the shock absorbing member according to claim 6, the shock absorbing member being provided in a position corresponding to one of at least a heel or MP joints of a foot of a wearer.

8. The shock absorbing member of claim 1, further comprising
   a backing plate provided to at least above or below the support members, and laid across the support members neighboring, the backing plate being shaped into a substantial plate.

9. A shoe including the shock absorbing member according to claim 8, the shock absorbing member being provided in a position corresponding to one of at least a heel or MP joints of a foot of a wearer.

10. A shoe including the shock absorbing member according to claim 1, the shock absorbing member being provided in a position corresponding to one of at least a heel or MP joints of a foot of a wearer.

* * * * *